Dec. 15, 1942.                M. A. GOODBAR                2,305,000
                            ACCOUNTING MACHINE
                            Filed March 18, 1940            14 Sheets-Sheet 1

Mayo A. Goodbar
Inventor

By Pearl Beust
His Attorney

Dec. 15, 1942.  M. A. GOODBAR  2,305,000
ACCOUNTING MACHINE
Filed March 18, 1940  14 Sheets-Sheet 2

Mayo A. Goodbar
Inventor
By Earl Benst
His Attorney

Mayo A. Goodbar
Inventor

Dec. 15, 1942.  M. A. GOODBAR  2,305,000
ACCOUNTING MACHINE
Filed March 18, 1940  14 Sheets-Sheet 4

Mayo A. Goodbar
Inventor
By *Pearl Bevis*
His Attorney

Dec. 15, 1942.    M. A. GOODBAR    2,305,000
ACCOUNTING MACHINE
Filed March 18, 1940    14 Sheets-Sheet 5
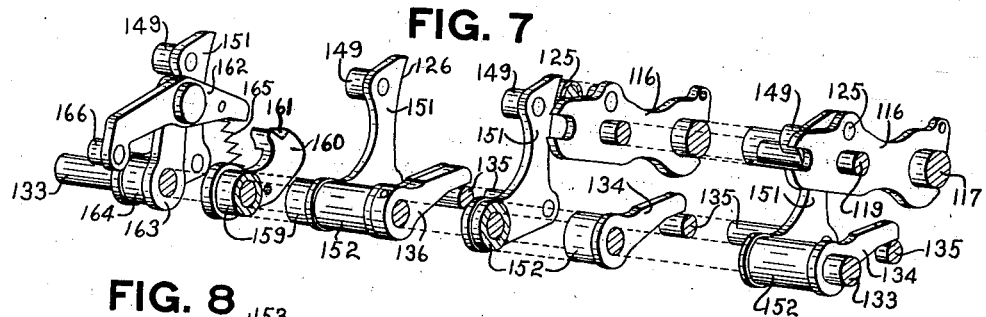
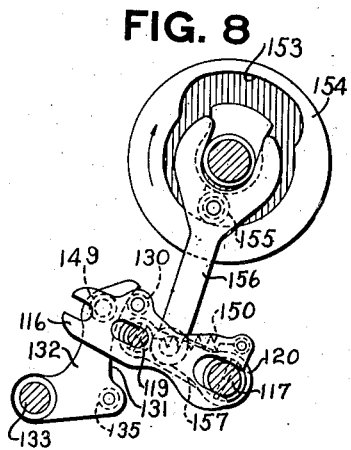
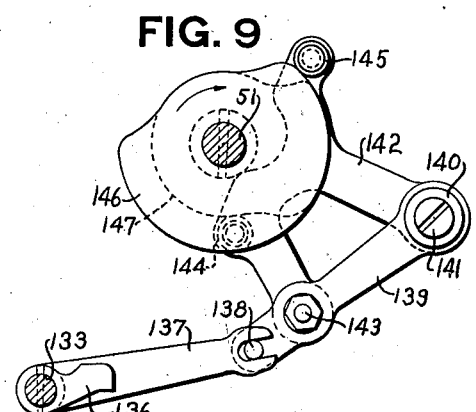
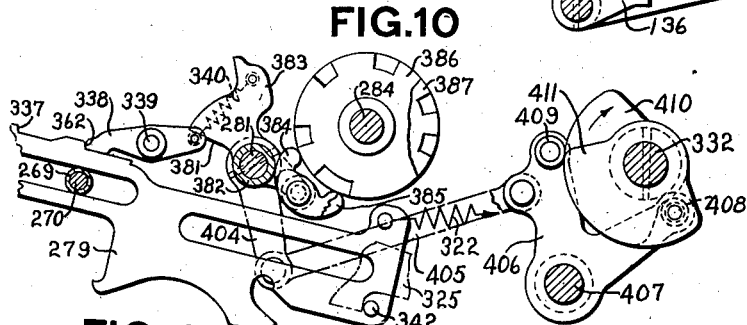
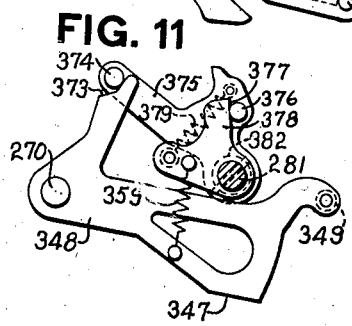
Mayo A. Goodbar
Inventor
By *Carl Bert*
His Attorney Dec. 15, 1942.  M. A. GOODBAR  2,305,000
ACCOUNTING MACHINE
Filed March 18, 1940  14 Sheets-Sheet 6
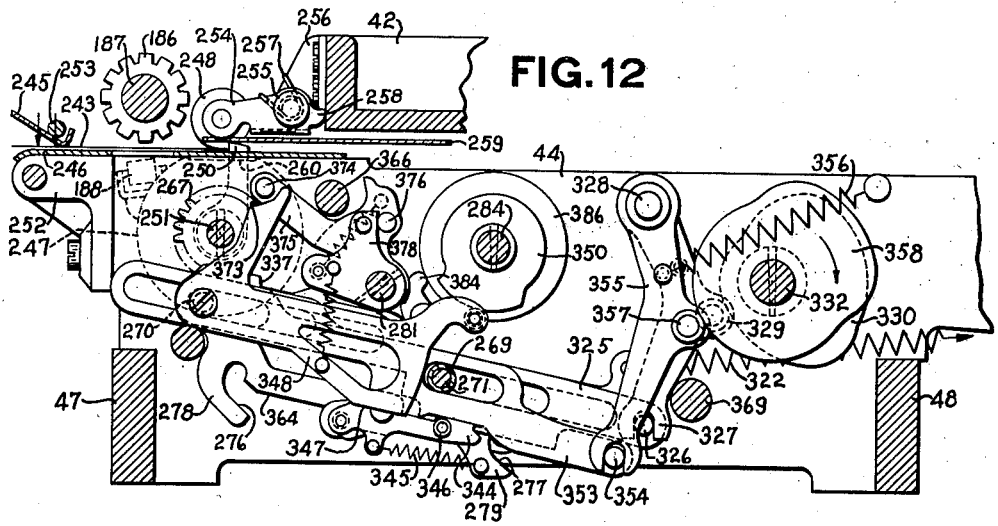
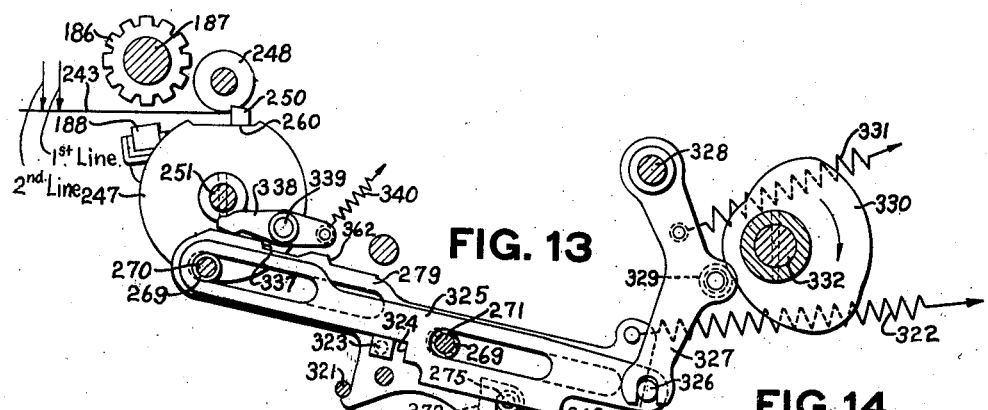
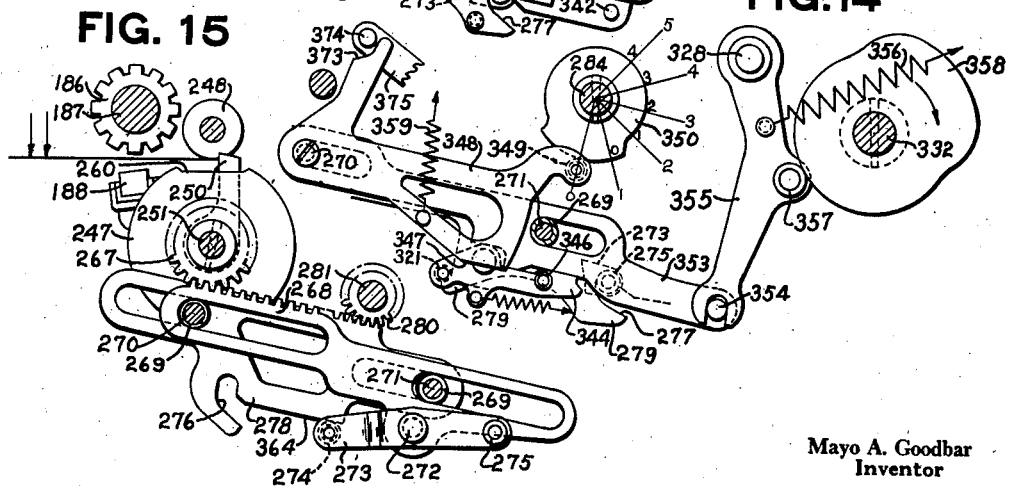
Mayo A. Goodbar
Inventor
By Earl Beust
His Attorney Dec. 15, 1942.   M. A. GOODBAR   2,305,000
ACCOUNTING MACHINE
Filed March 18, 1940   14 Sheets-Sheet 7

Mayo A. Goodbar
Inventor

By *Earl Benst*
His Attorney

Dec. 15, 1942.　　　　M. A. GOODBAR　　　　2,305,000
ACCOUNTING MACHINE
Filed March 18, 1940　　　　14 Sheets-Sheet 8
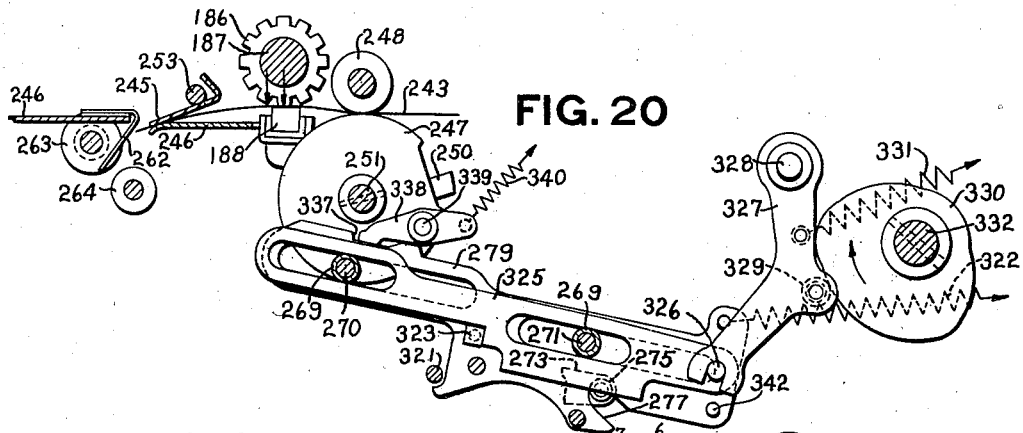
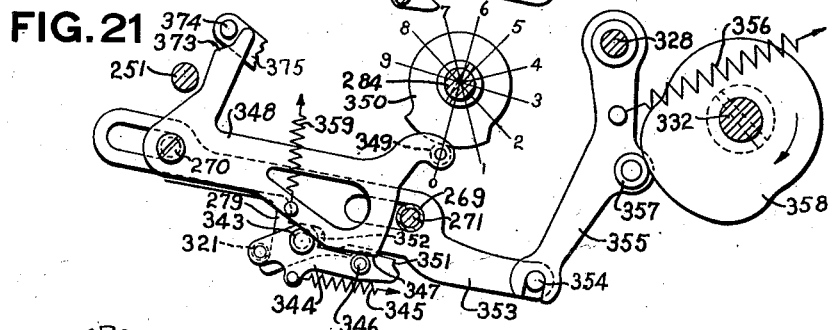
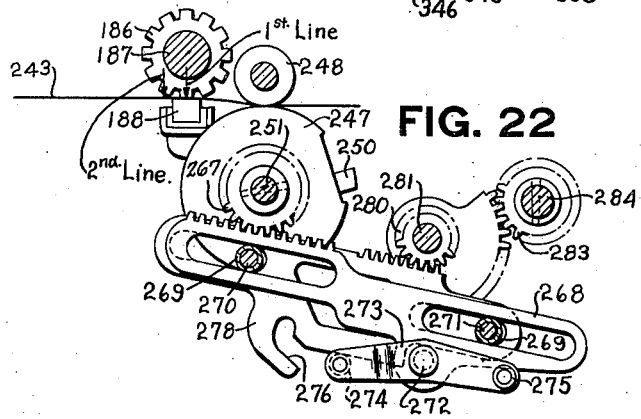
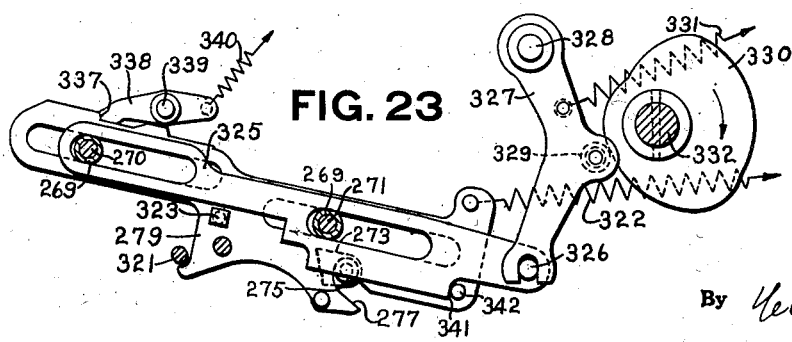
Mayo A. Goodbar
Inventor
By Yearl Beust
His Attorney Dec. 15, 1942.   M. A. GOODBAR   2,305,000
ACCOUNTING MACHINE
Filed March 18, 1940   14 Sheets-Sheet 9

Mayo A. Goodbar
Inventor
By Earl Beust
His Attorney

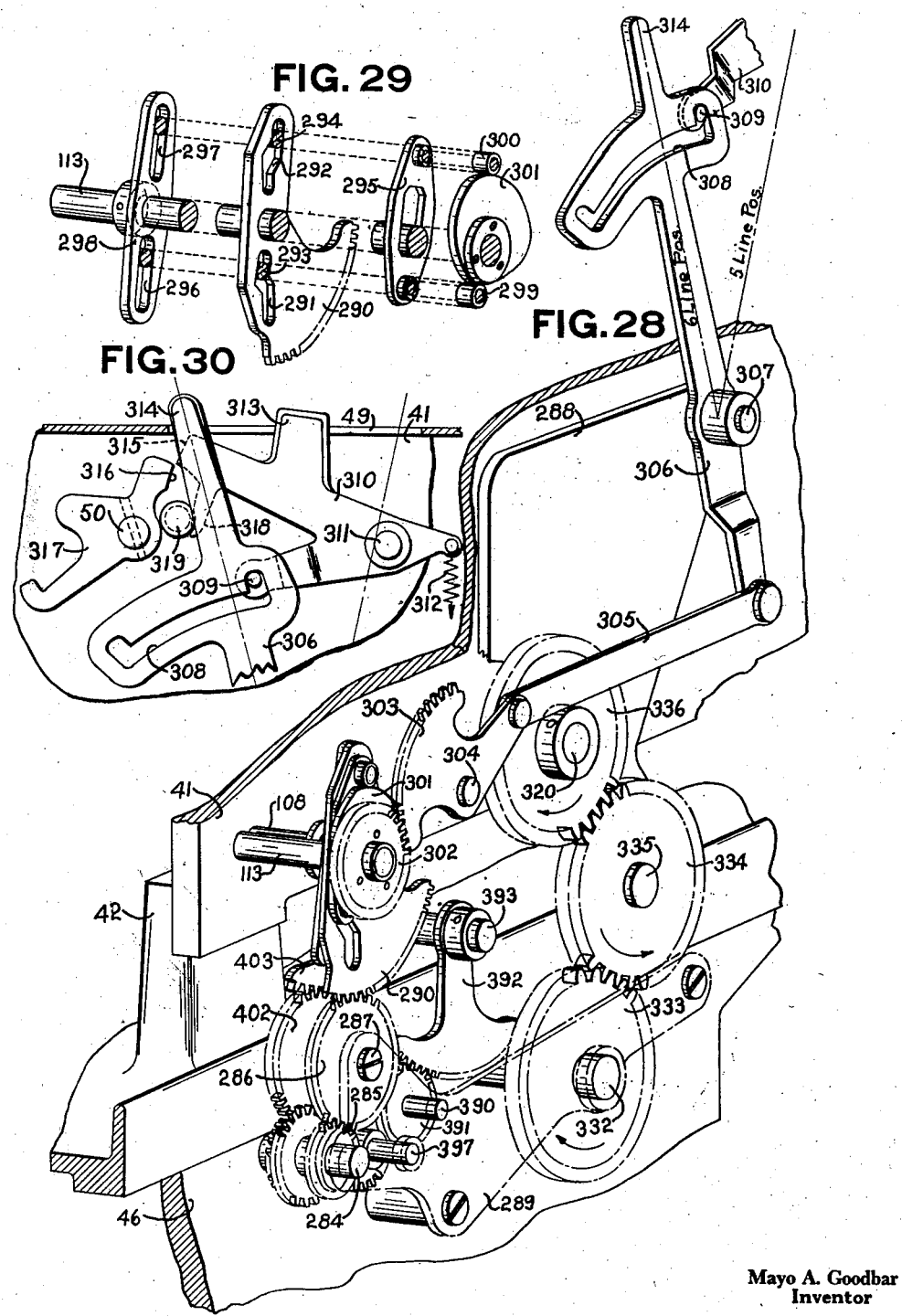

Dec. 15, 1942.   M. A. GOODBAR   2,305,000
ACCOUNTING MACHINE
Filed March 18, 1940   14 Sheets-Sheet 11

FIG. 31A

CUSTOMERS BILL — 243 — CASHIERS STUB

| | | |
|---|---|---|
| Local Service From June 26 To July 25 Inclusive. | 1168 00 | 1 Local Serv. |
| Additional Local Messages to July 25 Inclusive | 189 90 | 2 Add'l Msgs. |
| Toll Service and Telegrams. (Statement Enclosed) 94,909 | 100 20 | 3 Tolls, Etc. |
| Other Charges or Credits.(Statement Enclosed) | 32 67 | 4 Chg. or Cr. |
| Directory Advertising Monthly Installment Per Contract. | 1 25 | 5 Direc. Adv. |
| Balance Due.(Bill Previously Rendered) | 133 52 | 6 Balance |
| TOTAL | 11625 54* | TOTAL |

FIG. 32A

CUSTOMERS BILL — 244 — CASHIERS STUB

| | | |
|---|---|---|
| Local Service From June 26 To July 25 Inclusive. | 1168 00 | 1 Local Serv. |
| Toll Service and Telegrams.(Statement Enclosed) | 100 20 | 2 Tolls, Etc. |
| Other Charges or Credits.(Statement Enclosed) | 32 67 | 3 Chg. or Cr. |
| Directory Advertising Monthly Installment Per Contract. | 1 25 | 4 Direc. Adv. |
| Balance Due.(Bill Previously Rendered) | 133 52 | 5 Balance |
| TOTAL | 1435 64* | TOTAL |

FIG. 37.

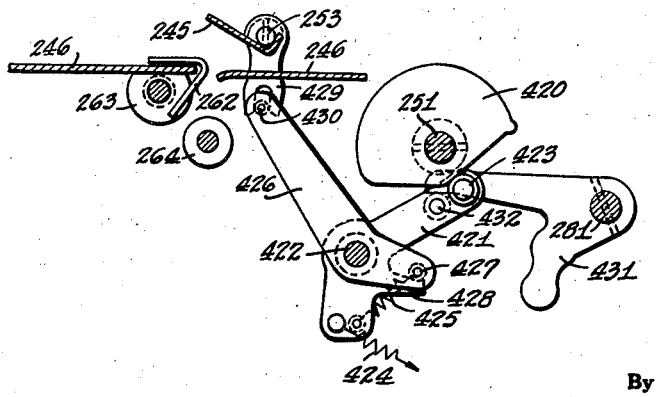

Mayo A. Goodbar
Inventor

By Earl Benst
His Attorney

Dec. 15, 1942.  M. A. GOODBAR  2,305,000
ACCOUNTING MACHINE
Filed March 18, 1940   14 Sheets-Sheet 12

FIG. 31B

| OFFICE STUB | | ACCOUNTING STUB |

243

| | | | | | | | | |
|---|---|---|---|---|---|---|---|---|
| 1116800 | | | | SERV. | 1116800 | | L | 1116800 |
| 18990 | | 94,909 | | MSG. | 18990 | | M | 18990 |
| 10020 | | | | TOLL | 10020 | REF. DEBIT CREDIT BALANCE | T | 10020 |
| 3267 | REF. DEBIT CREDIT BALANCE | | | Chg. or Cr. | 3267 | | O | 3267 |
| 125 | | | | ADV. | 125 | | D | 125 |
| 13352 | | | | BAL. | 13352 | | B | 13352 |
| 1162554* | | | | TOT. | 1162554* | | | 1162554* |

| OFFICE STUB | | ACCOUNTING STUB |

| | | | | | | | | |
|---|---|---|---|---|---|---|---|---|
| 1116800 | | | | SERV. | 1116800 | | L | 1116800 |
| 10020 | | | | TOLL | 10020 | | T | 10020 |
| 3267 | REF. DEBIT CREDIT BALANCE | | | CHG. or CR. | 3267 | REF. DEBIT CREDIT BALANCE | O | 3267 |
| 125 | | | | ADV. | 125 | | D | 125 |
| 13352 | | | | BAL. | 13352 | | B | 13352 |
| 1143564* | | | | TOT. | 1143564* | | | 1143564* |

Mayo A. Goodbar
Inventor

By Earl Benst
His Attorney

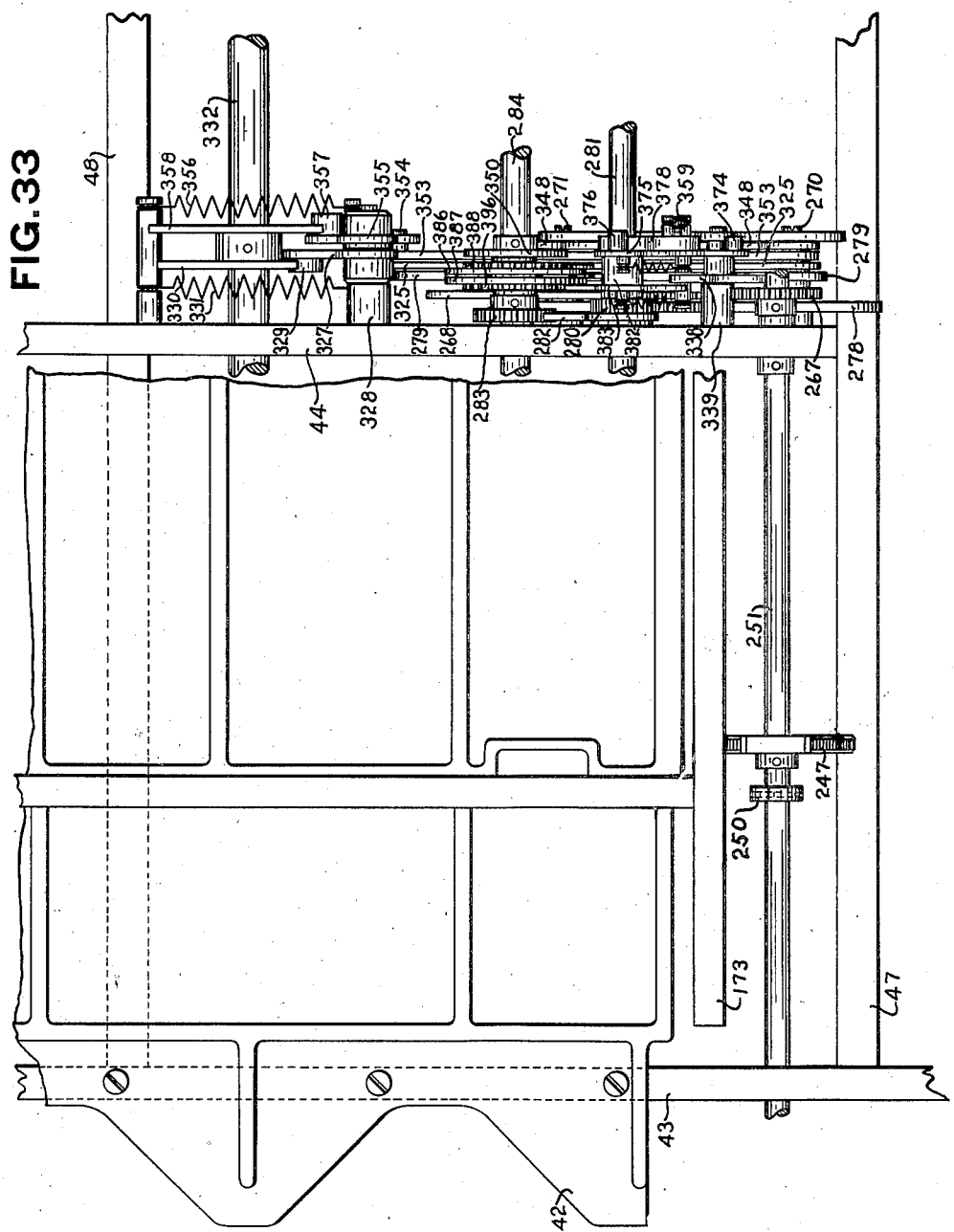

Dec. 15, 1942.    M. A. GOODBAR    2,305,000
ACCOUNTING MACHINE
Filed March 18, 1940    14 Sheets-Sheet 14
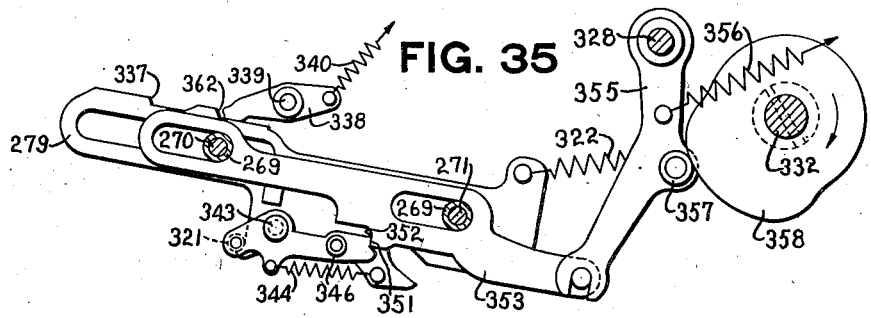
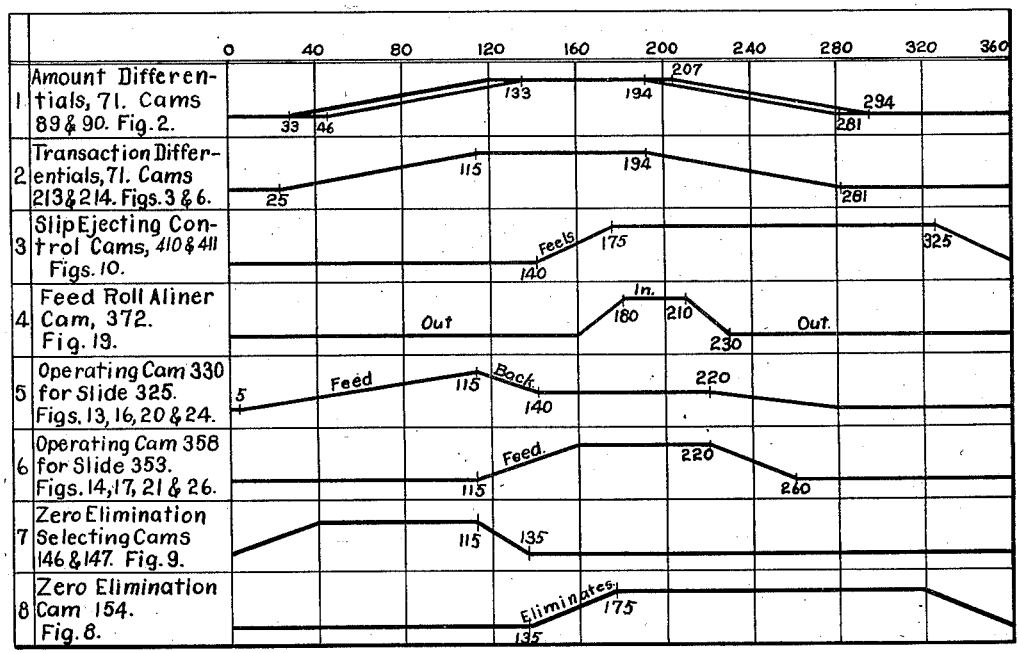
Mayo A. Goodbar
Inventor
By Carl Benst
His Attorney Patented Dec. 15, 1942

2,305,000

UNITED STATES PATENT OFFICE 2,305,000

ACCOUNTING MACHINE

Mayo A. Goodbar, Dayton, Ohio, assignor to The National Cash Register Company, Dayton, Ohio, a corporation of Maryland Application March 18, 1940, Serial No. 324,462

24 Claims. (Cl. 197—127)

This invention relates to accounting and similar business machines and is directed particularly to the record material feeding means of such machines.

The machine embodying the instant invention, as presently constructed, is adapted for use by public utility companies, such as telephone and gas and electric companies, for preparing statement slips or bills to be sent to their numerous subscribers or customers periodically—as a rule, once each month. Generally these monthly statements are composed of a customer's bill and a plurality of detachable stubs upon which the information contained upon the customer's bill is repeated for use by the cashier, the office, and the accounting department.

For preparing such statements, a column-printing business machine, which prints identical data upon each of the different portions of the statement, is admirably adapted. A machine of this type is fully disclosed in United States Patent No. 2,141,332, issued December 27, 1938, to Charles H. Arnold, to which reference may be had for a full disclosure of mechanism which is not pertinent to the present invention and which for that reason is not disclosed herein.

While the machine of this invention, in its present embodiment, is arranged for use by a telephone company in preparing statements for its subscribers, it is not the desire to limit this machine to such use, as with minor alterations it may be arranged for use in connection with numerous other types of business systems.

For a complete showing and description of standard mechanism not fully disclosed herein, reference may be had to Letters Patent of the United States Nos. 1,619,796, 1,747,397, and 1,761,542, issued, respectively, March 1, 1927, February 18, 1930, and June 3, 1930 to B. M. Shipley; and Letters Patent No. 2,175,346, issued October 10, 1939, to Maximilian M. Goldberg.

One object of this invention is to provide a column-printing accounting machine with means to feed record material back and forth from one printing position to another during a plurality of machine operations.

Another object is the provision of means to select at will any of the various lines of record material for printing thereon.

Still another object is to provide a column-printing accounting machine, adapted to print records in a plurality of horizontal lines on record material, with means to space the record material to any desired line with relation to the printing means, said spacing including forward and/or backward movement of the record material.

A still further object is to provide a column-printing accounting machine, adapted to perform a plurality of operations to compute and print a bill or statement, with means to print on any or all of a plurality of lines without regard to the order or sequence of the printing of said lines.

Another object is to provide a column-printing accounting machine, adapted to perform a plurality of operations to compute and print a bill, with means to move the bill in one direction to a particular printing position in the first operation and to move said bill back and forth to any or all of several remaining printing positions in succeeding operations.

Another object is to supply means to disconnect the zero elimination mechanism at the point where the amount keyboard is split, to permit the amount keys to be used for a dual purpose.

A further object is the provision of means, effective in sub-total and total printing operations, to connect the normally disconnected zero elimination mechanism.

A further object is to provide means to cause the record material line-spacing means, which normally spaces the record material to six different lines, to space the record material to five lines so that either five- or six-line statements may be prepared.

With these and incidental objects in view, the invention includes certain novel features of construction and combinations of parts, the essential elements of which are set forth in appended claims, and a preferred form or embodiment of which is hereinafter described with reference to the drawings which accompany and form a part of this specification.

In the drawings:

Fig. 1 is a diagrammatic view of the keyboard of the machine embodying the present invention.

Fig. 7 is a disassembled perspective view of the zero elimination mechanism.

Fig. 8 is a detail view of one of the operating cams for the zero elimination mechanism.

Fig. 9 is a detail view of another of the operating cams for the zero elimination mechanism.

Fig. 10 is a detail view showing particularly the control disks and mechanism associated therewith for controlling the ejecting of the statement slips.

Fig. 11 is a detail view of the statment slip or bill ejecting control lever.

Fig. 12 is a right side elevation of the bill feeding and ejecting mechanism.

Fig. 13 is a detail view of the mechanism for feeding the bill to the first printing line.

Fig. 14 is a detail view showing in particular the mechanism for shifting the control of the bill feeding to the second transaction bank.

Fig. 15 is a detail view of the bill feeding rack and of the control rack associated therewith.

Figs. 20, 21, and 22 illustrate respectively the mechanisms of Figs. 13, 14, and 15 when moved to first line printing position.

Fig. 23 shows the mechanism of Fig. 13 at the end of the first of a series of bill printing operations.

Figure 24:
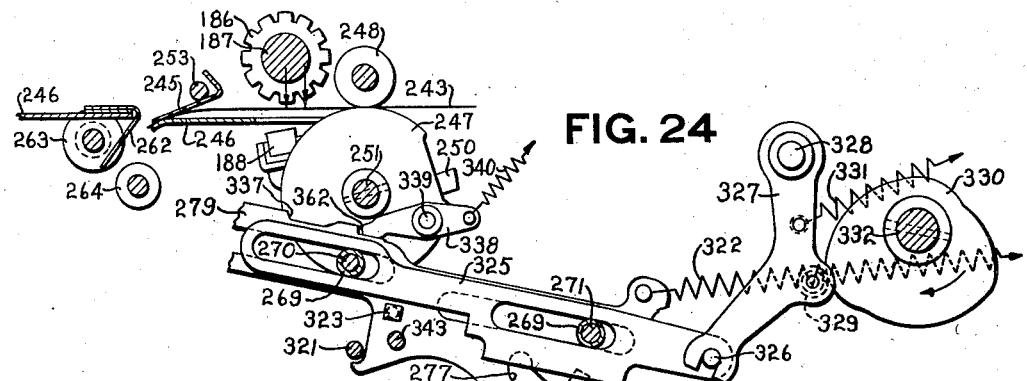
Figure 25:
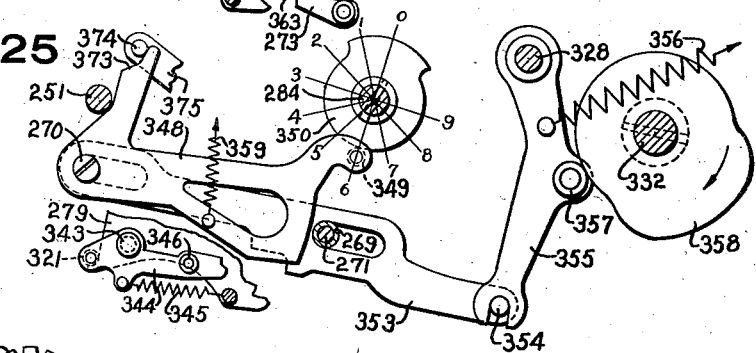
Figure 26:
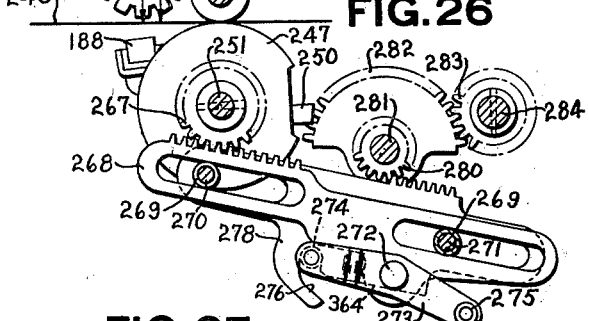

Figs. 24, 25, and 26 illustrate respectively the mechanisms of Figs. 13, 14, and 15 when the control of the line-spacing of the bill is shifted to the second transaction bank.

Figure 27:
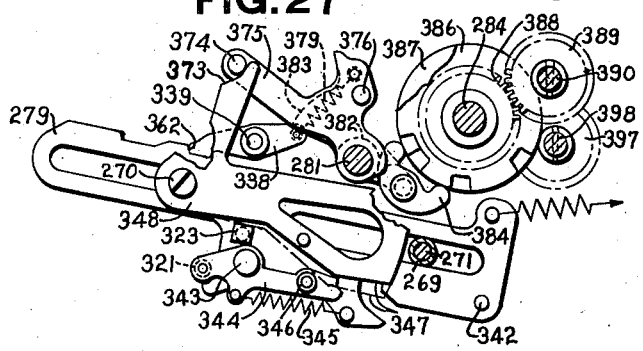

Fig. 27 is a detail view showing in particular the disks and associated mechanism for controlling the ejecting of the bill after printing is completed.

Fig. 28 is a perspective view of the mechanism for controlling the printing of five- or six-line bills.

Fig. 29 is a disassembled perspective view of a part of the mechanism of Fig. 28.

Fig. 30 is a detail view showing the interlocks for the lever which controls the printing of five- or six-line bills.

Figs. 31A and 31B together constitute a facsimile of a six-line bill having entries thereon printed by the machine of this invention.

Figs. 32A and 32B together constitute a facsimile of a five-line bill having entries thereon printed by the machine of this invention.

Fig. 33 is a top plan view showing in particular the side spacing of the mechanism of Fig. 12.

Fig. 34 is an assembled view of the zero elimination line.

Fig. 35 shows the mechanism for shifting the control of the line-selecting mechanism to the second transaction bank when other than the first line is selected for printing.

Fig. 36 is a timing chart illustrating in graphic form the movements of the various mechanisms pertinent to the present invention.

Fig. 37 shows the mechanism for operating the guide for the statement slips to and from closed throat position.

GENERAL DESCRIPTION

Described in general terms, the machine embodying the instant invention is of the type disclosed in the Arnold Patent No. 2,141,332 referred to hereinbefore. This machine is provided with a column-printing mechanism located at the front of the machine for simultaneously recording identical data in a plurality of columns of an insertable slip or bill during one operating cycle of the printing mechanism. Machines of this character are useful in the preparation of bills or statements by public utility companies, such as telephone companies, electric light and gas companies, and the like, said bills having several detachable portions with identical data printed thereon, said portions including, for example, a customer's bill, a cashier's stub, an office stub, and an accounting stub.

While the specific example chosen to illustrate the system used in connection with the machine of this invention is the preparation of statement slips by a telephone company for distribution to its various subscribers, it is not the intention to limit this machine to any particular business system, for with minor changes it may be adapted for use in connection with many business systems.

The main portion of the machine of this invention is of standard construction, and, as this standard mechanism is fully disclosed in the patents referred to hereinbefore, it will be but briefly treated herein. Likewise, the mechanisms for advancing the bills or statements to the printing mechanism and for ejecting said bills after printing is completed are somewhat similar to those disclosed in the Arnold Patent No. 2,141,332. However, in the Arnold machine it is necessary to print on the first printing line of the bill in the first operation of the machine, and, if the preparation of the bills or statements requires printing on more than one line, these lines have to be printed in consecutive order following the printing of the first line.

The machine of the present invention is arranged to prepare either five- or six-line bills; however, this is a matter of choice, as it is comparatively simple to arrange the machine to print on any reasonable number of lines. The bill feeding mechanism of the instant machine is much more flexible than the similar mechanisms of former machines. For example, it is not necessary to select the first line of a bill for printing in the first operation of the machine, but any line may be selected in the first operation and in succeeding operations the remaining lines of the bill may be selected for printing in any order desired. As a specific example, if the operator, after making an entry on the fourth line of the bill in the first operation, discovers that an entry has been omitted on the second line of said bill, this omitted entry may be made immediately without any difficulty whatever. This is a desirable feature not found in previous machines.

In fact, in the present machine, any line of the bill may be selected for printing in the first operation of the machine, and in succeeding operations the bill may be moved back and forth as required to print on the remaining lines in any order desired. However, there is one exception—it is necessary to make entries on the first line of the bill during the first operation, as it is impossible to return to this line in succeeding operations after other than the first line has been selected for printing in any preceding operation. However, this is not a disadvantage, as every bill issued requires the printing of data on the first line thereof.

Normally the machine is arranged to print a six-line bill, such as that shown in Figs. 31A and 31B, the six lines not including a total, which makes seven lines altogether. However, manipulative means is provided for varying the operation of the bill feeding mechanism so that a five-line bill, such as that shown in Figs. 32A and 32B, may be printed if desired. In the printing of a five-line bill, the first item is printed in exactly the same location as the first item of a six-line bill. However, in the five-line bill, the second item is omitted and all succeeding items are moved up one line-space, as will be explained fully later herein.

After all the entries have been made upon the bill, a total printing operation is performed, during which the total is printed on the various portions of said bill. After this, the bill is returned forward into cooperative relationship with the bill ejecting mechanism, which then functions to deposit the bill face down in a suitable receptacle conveniently located at the front of the machine. This stacking of the bills face down insures that they are in sequential order. Only a minor part of the bill ejecting and stacking mechanism has been shown and described herein, because this mechanism is similar in every respect to that disclosed in the Arnold Patent No. 2,141,332, to which reference may be had for a complete description thereof.

In the ensuing pages of this specification, mechanism pertinent to the present invention will be described in detail with reference to the drawings, in the different views of which like reference numbers refer to like parts.

DETAILED DESCRIPTION

Framework and operating mechanism

The main framework of the machine comprises a left frame 40 and a right frame 41 (Figs. 2, 3, 28, and 33), which support most of the machine mechanism and which are in turn secured to a machine base 42 and are further supported in relation to each other by various cross frames, rods, and bars. The base plate 42 rests on and is secured to four printer frames 43 to 46 inclusive, said frames being further secured in proper relationship to each other by front and rear tie bars 47 and 48 (Fig. 12) and various other bars, rods, and shafts. The printer frames 43 to 46 in turn are secured to the top surface of a sub-base (not shown), and the mechanism of the machine is enclosed by a suitable cabinet or case 49.

Normally the machine is electrically operated by a conventional type of motor, in a manner such as that disclosed in the Shipley patents referred to hereinbefore, and, in addition, a hand crank is provided for operating the machine manually when necessary. The well-known electric starting bar, used on previous machines such as the ones shown in the Shipley Patents Nos. 1,747,397 and 1,761,542 mentioned at the beginning of this specification, has been omitted from this machine, and instead the machine is released for operation by depression of any one of a plurality of so-called "motorized" or "operating" keys, located in the total control row and in the first and second transaction banks. These keys will be explained more in detail later herein.

Depression of any of the operating keys releases a key lock shaft 50 (Figs. 2 and 30) to the action of a spring (not shown) which rocks said shaft a slight distance clockwise to operate the clutch mechanism which connects the driving motor to a main shaft 51, journaled in the main frames 40 and 41, and simultaneously operates the switch mechanism which closes the circuit to the motor, causing the motor to operate. After the machine has performed the proper number of cycles to complete the type of operation being executed, the key lock shaft 50 is returned counter-clockwise to disengage the clutch mechanism and simultaneously to open the switch to the electric motor. When the machine is manually operated, by the use of the hand crank, the operating keys are used for releasing the machine in exactly the same manner as when said machine is electrically operated.

Keyboard

Referring to Fig. 1, which is a diagrammatic showing of the keyboard, it will be seen that there are seven rows of amount keys 52, four rows of printing keys 53, which do not add into any of the totalizers, and a combination row of keys 54, which in adding and subtracting operations may be used in conjunction with the keys 53 for printing certain data upon the bills or slips, and in addition the totalizer wheels in this denomination provide an overflow for the amount banks 52 to increase the registering capacity of the machine.

The present machine has total control plate 64 (Fig. 4) for controlling the engaging and disengaging movement of the three totalizer lines in adding, non-adding, subtracting, total-printing, and sub-total printing operations. The positioning of the total control plate 64 is controlled by total keys 55 to 60 inclusive, located near the right-hand side of the keyboard. The key 55 is a stay-down key and is released by the depression of a Non-add release key 61. The present machine has three lines of totalizers, including two lines of adding totalizers and an add-subtract or balance totalizer. The adding totalizers on one line and the add-subtract totalizer are selected for engagement with the actuators by means of a #1 row of transaction keys 62 (Figs. 1 and 3), and the adding totalizers on the other line and the add-subtract totalizer are selected for engagement with the actuators by means of a #2 row of transaction keys 63.

The manner in which the transaction keys 62 and 63 control the selection of the different totalizers, and the manner in which the keys 55 to 60 and the plate 64 control the engaging and disengaging movements of the different totalizer lines, are fully explained in the Shipley patents referred to previously and in the co-pending application of Shipley et al., Serial No. 677,980, filed June 28, 1933, which issued on November 11, 1941, as United States Patent No. 2,262,258. As this mechanism has no direct bearing upon the present invention, it is believed that the general description given above will be sufficient.

Amount banks and their associated differential mechanisms

Figure 2:
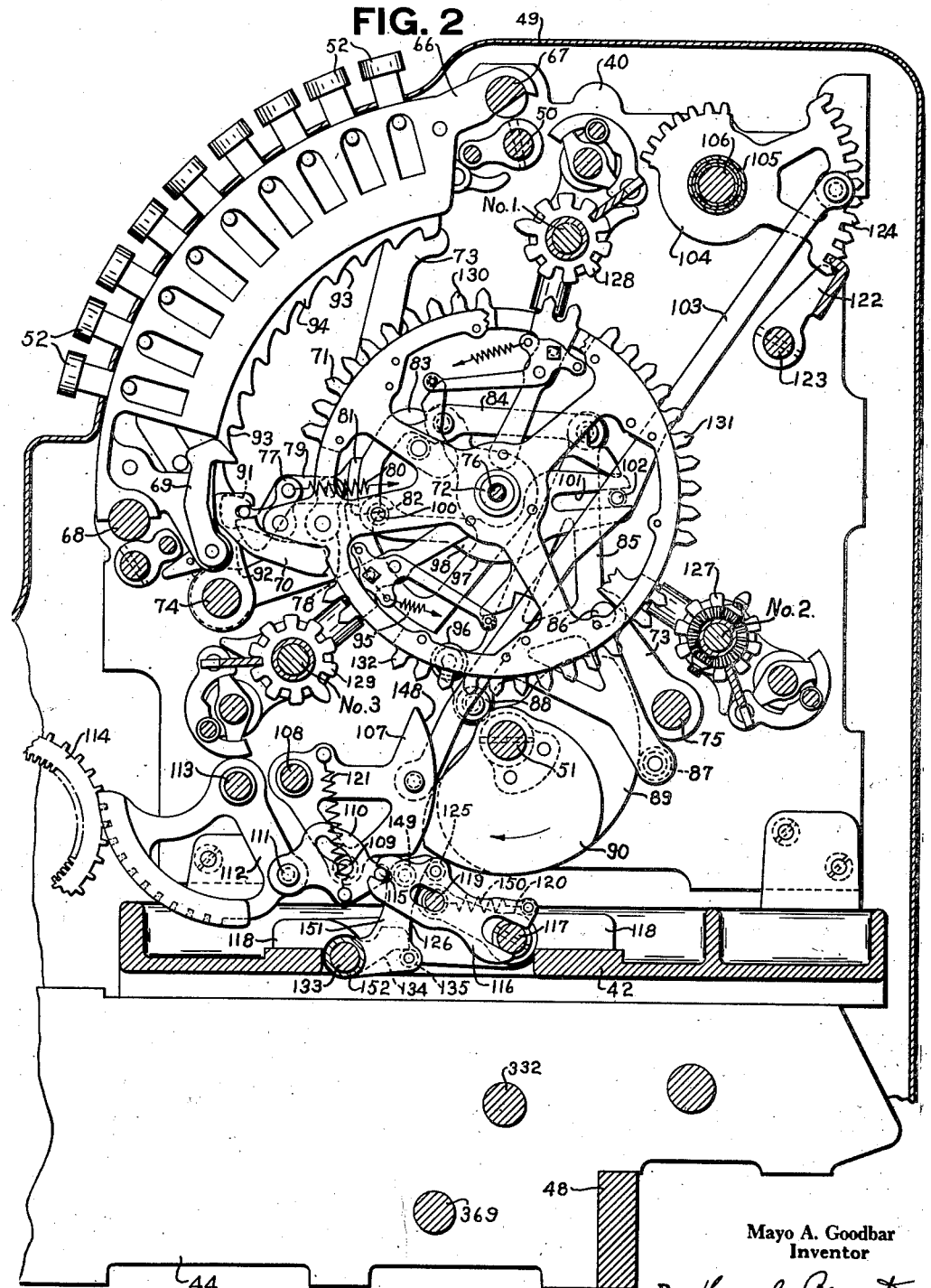
Fig. 2 is a sectional view of the machine taken just to the right of one of the amount banks, showing said bank and the differential mechanism associated therewith.

As previously stated, the machine of this invention has seven rows of amount keys 52 (Fig. 1), and, as each row or bank of keys and its associated differential mechanism are similar in every respect, it is believed that a description of one of these rows of keys and its differential mechanism will be sufficient. Fig. 2 is a transverse sectional view of the machine taken just to the right of one of the amount banks, showing said bank and its associated differential mechanism, which will be considered as representative of all the amount banks. These differential mechanisms are similar to the ones shown in the patents to Shipley and Goldberg listed above.

The amount keys 52 are mounted in a key bank framework 66 supported by rods 67 and 68 extending between the main frames 40 and 41. The depression of any one of the keys 52 rocks a zero stop pawl 69, for this particular denomination, counter-clockwise out of the path of a reset spider 70 free on a hub of an amount differential actuator 71, rotatably supported by a hub 72 extending between two similar amount differential support plates 73, only one here shown, in turn supported by rods 74 and 75 extending between the main frames 40 and 41. There is a pair of the support plates 73 for each amount differential, and a tie rod 76 extends through holes in the center of the hubs 72 to secure all of the amount differentials in a compact unit.

A slot in the forward end of the spider 70 (Fig. 2) engages a stud in a latch-disengaging arm 77 pivoted on an extension of the actuator 71. The arm 77 and a companion arm 78 together support a differential latch 79 for horizontal shifting movement. A spring 80 urges the arms 77 and 78 and the latch 79 rearwardly to normally hold a foot-shaped projection 81 of said latch in engagement with a shoulder 82 on a differential driving segment 83 rotatably supported on the hub of the actuator 71. A link 84 pivotally connects the driving segment 83 to a cam lever 85 pivoted on a stud 86 in the left-hand one of the plates 73, and said lever 85 carries rollers 87 and 88, which cooperate respectively with the peripheries of companion plate cams 89 and 90 secured on the main shaft 51. Depression of one of the amount keys 52 likewise moves the lower end thereof into the path of a rounded surface 91 on an extension of the arm 77.

In adding operations, the main shaft 51 and the cams 89 and 90 make one clockwise revolution, causing the lever 85 to rock the driving segment 83 first clockwise and then back to normal position, according to the time given in space 1 of the chart (Fig. 36). During its clockwise movement the segment 83, by means of the shoulder 82, in cooperation with the extension 81 of the latch 79, carries said latch and the amount actuator 71 clockwise in unison therewith until the rounded surface 91 contacts the stem of the depressed amount key 52. This rocks the latch arm 77 and its companion arm 78 counter-clockwise to disengage the projection 81 from the shoulder 82 to interrupt the clockwise movement of the actuator 71 and to position said actuator in proportion to the depressed amount key 52. Disengaging movement of the latch 79 moves a rounded extension 92 thereof into engagement with the corresponding one of a series of locating notches 93 on a plate 94 secured between the rod 74 and an upward extension of the left-hand support plate 73.

After the latch 79 is disengaged from the shoulder 82 of the segment 83, said segment continues its clockwise movement without interruption, causing an arcuate surface 95 thereof, in cooperation with the sole of the foot-shaped projection 81, to lock the extension 92 of the latch 79 in the notch 93 corresponding to the depressed amount key. When the lever 85 (Fig. 2) and the segment 83 reach the termini of their initial movements clockwise, a roller 96, carried by said lever 85, engages an arcuate surface 97 on the downward edge of an amount beam 98 pivoted at 100 to the actuator 71, and forces an arc-shaped surface on the inner edge of said beam into contact with the hub of said actuator 71 to position the beam 98 in proportion to the depressed amount key 52.

The beam 98 has therein a slot 101, which engages a stud 102 in a link 103, the upper end of which is pivotally connected to an indicator positioning and totalizer selecting segment 104 mounted on one of a series of nested tubes 105 supported by shaft 106 journaled in the frames 40 and 41. The lower end of the link 103 is pivotally connected to a segment 107 free on a shaft 108 journaled in the frames 40 and 41. The segment 107 carries a stud 109, which engages a camming slot in a zero elimination cam plate 110 pivotally mounted on a stud 111 in a segmental gear 112 free on a shaft 113 journaled in the frames 40 and 41. The teeth of the segmental gear 112 mesh with the external teeth of an external-internal ring gear 114, similar in every respect to the ring gears shown in Fig. 5 and having internal teeth which mesh with a pinion which drives a square shaft. The square shaft in turn drives similar pinions meshing with the internal teeth of gears similar to the gear 114, the external teeth of which gears are adapted to mesh with and drive corresponding denominational type wheels in each row of the column-printing mechanism.

This method of driving the type wheels of the column-printing accounting machine is fully explained in the United States Patent No. 2,141,332 issued to Charles H. Arnold and embodies an application of the well-known principle of driving mechanism disclosed in United States Patent No. 1,693,279 issued to Walter J. Kreider.

The plate 110 carries a stud 115 which is engaged by a slot in the end of a zero elimination operating slide 116 having therein parallel slots which engage, respectively, a shaft 117 journaled in brackets 118 secured to the base 42, and a rod 119 supported by arms 120, only one here shown, secured on the shaft 117. A spring 121, tensioned between the segment 107 and the plate 110, normally maintains the lower end of the cam slot in said plate 110 in engagement with the stud 109, as shown in Fig. 2.

Before the roller 96 engages the arcuate surface 97 of the beam 98, the slide 116 is shifted rearwardly, in a manner later to be described, to disengage the notch in the end thereof from the stud 115. At about the same time, an indicating and printing mechanism aliner 122, mounted on a shaft 123 journaled in the frames 40 and 41, is rocked out of engagement with the alining teeth 124 in the segment 104. Immediately thereafter, the roller 96 engages the surface 97 of the beam 98 to position said beam, the link 103, and the segments 104 and 107 in proportion to the value of the depressed amount key 52. In this case, the plate 110 acts as a link between the segment 107 and the gear sector 112, causing said gear sector to move in unison with said segment to position the external-internal gear 114 and the column-printing type wheels, for this particular denomination, in proportion to the value of the depressed amount key 52. After the segments 104 and 107 have been positioned, the aliner 122 is rocked into engagement with the teeth 124 to retain said segments and their associated mechanisms in set positions.

Totalizers

The machine of this invention has two lines of interspersed adding totalizers, an upper or No. 1 line and a front or No. 3 line, and one add-subtract, or balance, totalizer, otherwise known as the "back" or "No. 2" totalizer. The No. 2 or balance totalizer has a set of adding wheels 127, which are reversely geared in corresponding subtracting wheels, not shown but well known in the art.

The No. 1 or upper adding totalizer has two sets of adding wheels 128, one set of which corresponds to the adding wheels 127 of the balance totalizer and the other set of which corresponds to the subtracting wheels of said balance totalizer, and the shifting mechanisms for the No. 1 and No. 2 totalizers are connected together so that said totalizers shift laterally, with relation to the actuator 71, in unison. The No. 1 and No. 2 totalizers are selected for engagement with the actuators 71 by the Balance due credits key 62 (Fig. 1) and the Other credits key 62, as will be more fully explained later. The No. 3 or front totalizer line has six sets of adding wheels 129, which are selected for engagement with the actuators 71 by the keys 63 (Fig. 1) of the second transaction bank.

In adding operations, the wheels of the selected totalizer or totalizers, as the case may be, are engaged with their respective sets of actuating teeth 130, 131, and 132 of the actuator 71, after said actuator has completed its setting movement clockwise. Return movement counter-clockwise of the actuator 71, as explained above, rotates the corresponding wheels of the selected totalizer or totalizers in proportion to the value of the depressed amount key 52, to enter said amount into said selected totalizer or totalizers. In subtract operations, the corresponding subtract wheel of the balance totalizer is engaged with the teeth 131 of the actuator 71, exactly the same as in adding operations, and return movement of said actuator reversely rotates the adding wheel 127, through the reverse gearing here shown, to subtract therefrom the amount set up on the amount key 52.

If no amount key 52 (Fig. 2) is depressed, the zero stop pawl 69 remains in the path of the spider 70 upon initial movement of the actuator 71 and engages said spider and breaks the latch 79 to locate said actuator in zero position. After the actuator 71 is positioned at zero, the roller 96 positions the beam 98, link 103, and segments 104 and 107 in proportion thereto, as shown in Fig. 2. At the end of any type of operation the actuator 71 is always returned to home position, as shown in Fig. 2. However, the link 103 and the indicating and printing mechanisms controlled thereby remain in set positions at the end of machine operation and are moved directly from these set positions to their new positions in the succeeding machine operation. The usual tens transfer mechanism is provided for transferring from lower to higher denominations in adding and subtracting operations.

Zero elimination mechanism

The present machine is provided with zero elimination mechanism for controlling the printing of zeros, somewhat similar to that disclosed in the Arnold patent mentioned previously herein. However, the mechanism of the present machine has been improved so as to function properly with the split and normal keyboard with which the present machine is equipped. In adding and subtracting operations the zero elimination mechanism is split into two separate units, one for the amount keys 52 (Fig. 1) and one for the printing keys 53 and 54. However, in total printing operations it is desired to connect the zero elimination mechanism for the row of keys 54, which, as previously described, is a combination bank, with the zero elimination mechanism for the amount keys 52, so that the zero elimination mechanism for this overflow bank will function in conjunction with the zero elimination mechanism for the amount banks 52. In the present machine there is no zero elimination mechanism for the two lowest order or cents and dimes amount banks, as it is desirable to have the zeros of these amount banks print at all times. With this exception, all the other banks, including the printing keys 53 and 54, have zero elimination mechanism.

Referring now to Figs. 2, 7, and 34, the zero elimination slide 116 carries a roller 125, which cooperates with an arcuate surface 126 on a shifting arm 151 turnably supported by a shaft 133 journaled in the brackets 118. A hub 152 connects the arm 151 to a companion arm 134, which cooperates with a stud 135 in the arm 151 of the next lower denomination. Likewise the arm 151, for the denomination being described, also has a stud 135, which cooperates with the arm 134 of the next higher denomination, and so on. Secured on the shaft 133 (Figs. 7 and 34) is an arm 136, similar in outline to the arms 134, and arranged to cooperate with the stud 135 in the arm 151 for the sixth bank of amount keys 52. Also secured on the left-hand end of the shaft 133 (Figs. 9 and 34) is an arm 137 bifurcated to receive a stud 138 in one end of a lever 139, the other end of which is free on a hub 140 rotatably supported by a stud 141 in a bracket (not shown) secured to the base plate 42. The hub 140 is secured in one arm of a two-armed lever 142, the other arm of which is connected to the lever 139 by an eccentric adjusting cam 143. The lever 142 carries rollers 144 and 145, which cooperate respectively with the peripheries of companion plate cams 146 and 147, secured on the main shaft 51.

As previously explained, the main shaft 51 makes one clockwise revolution in adding and subtracting operations, and near the beginning of this revolution the cams 146 and 147 (Fig. 9 and space 7, Fig. 36), in cooperation with the rollers 144 and 145, rock the levers 142 and 139 counter-clockwise, causing the stud 138, in cooperation with the arm 137, to rock the shaft 133 and arm 136 clockwise. Clockwise movement of the arm 136 causes said arm, in cooperation with the stud 135 of the sixth amount bank (Figs. 7 and 34), to rock the arms 151 and 134 for this bank clockwise in unison therewith, and this movement is transferred by said arm 134 to the stud 135 of the next lower denomination, and so on down the line through all the lower denominations. Clockwise movement of the arm 151 causes the arcuate surface 126, in cooperation with the roller 125, to shift the slide 116, associated therewith, rearwardly, against the action of a spring 150, to disengage the notch therein from the stud 115 in the zero elimination cam 110. The slides 116 remain disengaged from the studs 115 until after the amount actuators 71 have been positioned in proportion to the value of the depressed amount keys.

Assuming, for example, that a key has been depressed in the amount bank shown in Fig. 2, positioning of the segment 107 therefor, in relation to the depressed key, moves an arcuate surface 148 of said segment into the path of a roller 149 mounted on the slide 116 to obstruct return movement forwardly of said slide when the cams 146 and 147 (Fig. 9 and space 7, Fig. 36) return the shaft 133 and arm 136 counter-clockwise after the amount differentials 71 and their associated mechanisms have been positioned. The arcuate surface 148, in cooperation with the roller 149, retains the arm 139 and its associated slide 116 in moved positions, and the arm 134 (Figs. 7 and 34) associated with the arm 151, in cooperation with the stud 135, retains the arm 151 for the next lower denomination in moved position, and so on through the other lower denominations. It is therefore evident that all the zero elimination slides 116 for the amount banks in which a key is depressed, and for all lower order amount banks, are retained in disengaged positions, so that when said slides are subsequently rocked back and forth, as will be described later, no movement is imparted to the cam 110 (Fig. 2) and consequently the type wheels of all lower denominations remain in zero position when no keys are depressed in these lower denominations.

Assuming that no key is depressed in the amount bank shown in Fig. 2 or in any of the lower order amount banks, the segment 107 is positioned at zero, as here shown, in which position a clearance portion of said segment is opposite the roller 149. Consequently return movement forwardly of the arm 151 and the slide 116 is not obstructed and such movement, under the influence of the spring 150, permits the notch in the end of said slide to reengage the stud 115. After the notch in the slide 116 has reengaged the stud 115, a cam slot 153 (Fig. 8 and space 8, Fig. 36) in a cam 154 secured on the main shaft 51, in cooperation with a roller 155 carried by a pitman 156, the upper end of which is bifurcated to straddle a hub of the cam 154 and the lower end of which is pivotally connected to a crank 157 secured on the shaft 117, shifts said pitman 156 first downwardly to rock the shaft 117, rod 119, and slide 116 first counter-clockwise. Counter-clockwise movement of the slide 116 (Fig. 2), by means of the stud 115, rocks the zero elimination cam 110 clockwise, against the action of the spring 121, to cause the cam slot in said cam, in cooperation with the stud 109, which is held against displacement at this time by the aliner 122, to shift said cam 110 rearwardly to rock the segment 112 counter-clockwise.

Counter-clockwise movement of the segment 112 moves the ring gear 114 clockwise from zero position to one position beyond zero, which in this case is a blank position, so that the type wheels associated with this amount bank will not print zeros. It is therefore obvious that the slides 116 for all lower denominations are also reengaged with their respective studs 115, and as a consequence no zeros are printed in said lower denominations. After printing has been effected, continued rotation of the cam 154 (Fig. 8 and space 8, Fig. 36) returns the slides 116 and connected parts to normal positions, as shown in Fig. 2.

By observing Figs. 7 and 34, it will be noted that the arm 136 cooperates with the stud 135 of the arm 151 for the next-to-the-highest or sixth denomination of amount keys instead of the highest. As a result of this, the printing of the zero for the highest or seventh order of amount keys is eliminated in adding and subtracting operations, and this is as it should be, because it is unnecessary for a zero to be printed in the highest order amount bank except in total-printing operations.

As brought out previously herein, the zero elimination mechanism is split between the highest order amount bank 52 (Figs. 1 and 34) and the five rows of printing keys 53 and 54, said printing rows having their own zero elimination mechanism, which functions independently of and in exactly the same manner as the similar mechanism for the amount banks. The arms 151 for the printing banks are actuated by a driving arm 158 secured on the shaft 133, similar to the arm 136, and cooperating with the stud 135 in the highest order arm 151 for the printing keys.

As previously stated, the keys 54 of the combination bank are used in cooperation with the keys 53 for printing various data, and the corresponding totalizer wheels for said keys 54 are used as overflow wheels for the totalizer wheels associated with the amount banks 52. As it is necessary to use these overflow wheels in conjunction with the wheels associated with the amount keys 52 to print the amounts standing on the wheels in total and sub-total printing operations, means have been provided for connecting the zero elimination mechanism for the bank of keys 54 to the zero elimination mechanism for the highest order amount bank 52. Such mechanism is well shown in Figs. 5, 7, and 34 and will now be described.

The arm 151 for the highest order row of amount keys 52 is connected by a hub 159 to a pawl 160, said hub being free on the shaft 133. The pawl 160 has a shoulder 161, which cooperates with the rearward end of an arm 162 pivotally mounted on a crank 163 free on the shaft 133 and connected by a hub 164 to the arm 151 for the combination bank of keys 54. A spring 165 urges the arm 162 clockwise to normally maintain a stud 166, carried thereby, in engagement with the periphery of a plate cam 167, (Fig. 5) fixedly connected to a gear sector 168 free on the shaft 113. The gear sector 168 (Fig. 5) meshes with the external teeth of an external-internal gear 169, the internal teeth of which bear on the periphery of a disk 170 supported by a hexagon rod 171 journaled in a series of plates 172 (Fig. 4) secured to a bar 173, in turn secured to the main frames 40 and 41 and to the machine base 42. The gear 169 has secured thereto a ring gear, the teeth of which mesh with a pinion 174 fast on a shaft 175 journaled in the plates 172. A pinion 176, also secured on the shaft 175, meshes with teeth in a ring gear secured to an internal-external drive gear 177, similar to the gear 169, to which it is operatively connected by the overdrive explained above. The internal teeth of the gear 177 bear on the periphery of a disk 178 supported by the rod 171, and the external teeth of said gear 177 mesh with a gear sector 179 free on the shaft 113. A link 180 (Figs. 4 and 5) connects the sector 179 to a two-armed lever 181, free on the shaft 108, said lever in turn being pivotally connected by a link 182 to the total control plate 64.

The mechanism just described operatively connects the cam 167 (Fig. 5) to the total control plate 64, which, as previously explained, is positioned under control of the total keys 55 to 60 inculsive (Fig. 11) in the manner fully disclosed in the United States Patent No. 2,262,258 to Shipley et al.

In adding operations, the total control plate 64 (Fig. 4) is located in adding position automatically, and naturally does not require depression of any of the total keys in the total row. When the total control plate is in adding position, the cam 167 is positioned as shown in Fig. 5, so that a high portion of the periphery thereof is opposite the stud 166, to retain the arm 162 in the position here shown, so that the end thereof is out of the path of the shoulder 161 (Fig. 7) of the pawl 160. This disconnects the zero elimination mechanism of the combination bank 54 from the zero elimination mechanism of the highest order amount bank 52, and consequently the printing of zeros in the lower orders is not affected by said combination bank 54.

Figure 4:
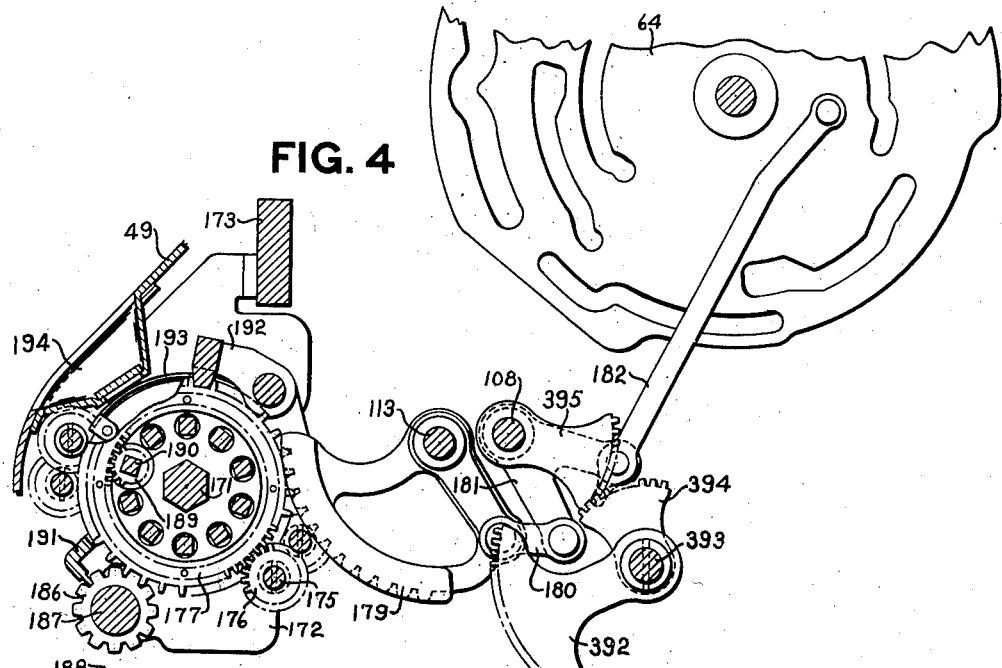
Fig. 4 is a fragmentary side view of the total control plate and the printing and indicating mechanism associated therewith.
Figure 5:
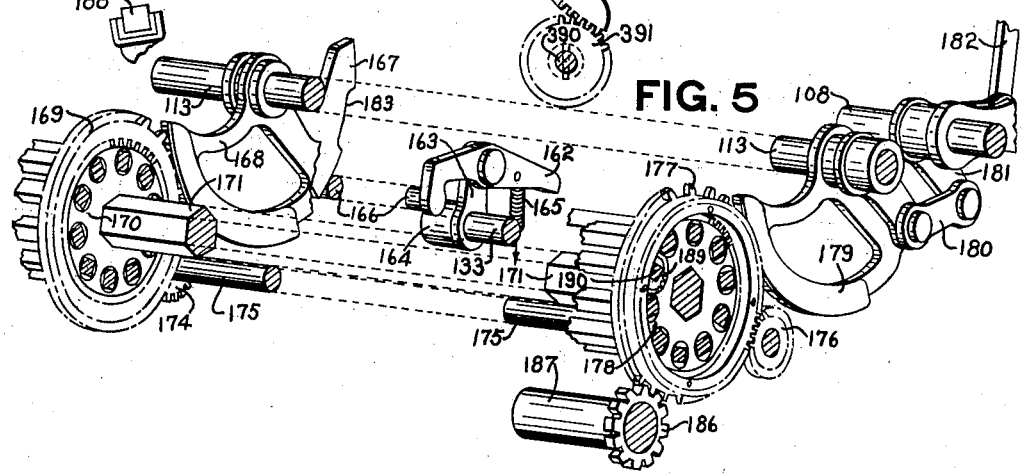
Fig. 5 is a disconnected perspective view showing in particular the mechanism operated by the total control plate for controlling the connecting and the disconnecting of the zero elimination mechanism.

When any one of the total control keys 56, 57, or 58 (Fig. 1) is depressed to initiate a total or a sub-total printing operation, the total control plate 64 is positioned in proportion thereto and, by means of the mechanism shown in Figs. 4 and 5, positions the cam 167 so that a low portion 183 of the periphery thereof is opposite the stud 166. This permits the spring 165 to rock the arm 162 clockwise to move the end of said arm into the path of the shoulder 161 (Figs. 7 and 34) of the pawl 160, to connect the zero elimination mechanism of the combination bank 54 to that of the highest order amount bank 52, to permit said combination bank to control the printing of the zeros in the lower denominations. The keys 55, 59, and 60 cause the cam 167 to be positioned so that the high portion of the periphery thereof is opposite the stud 166 to retain the arm 162 out of the path of the pawl 160, so that the zero elimination mechanism of the overflow bank will not be connected to that of the amount banks 52.

The external teeth of the gear 177 (Figs. 4 and 5) mesh with the teeth of a total row type wheel 186 free on a type wheel line 187, and consequently said type wheel is positioned in proportion to the position of the total control plate 64 and, in cooperation with a hammer 188, prints on the statement slip a symbol characteristic of the type of operation being performed. Type wheels (not shown), similar to the type wheel 186, are provided for printing in the other columns of the statement slip, and said type wheels are driven by means of the internal teeth of the gear 177 in cooperation with a pinion 189 turnably supported in a boring in the disk 178 and secured to a shaft 190. The shaft 190 drives pinions, similar to the pinion 189, which in turn drive internal-external gears, similar to the gear 177, and their corresponding type wheels for the various columns of the statement slip.

An aliner 191 (Fig. 4), in cooperation with the teeth of the type wheels 186, secures said type wheels against displacement during the impression stroke of the hammers 188. An aliner 192 (Fig. 4), in cooperation with the external teeth of the external-internal gears, holds said gears against displacement during the impression stroke, and both the aliners 191 and 192 are disengaged while the type wheels and external-internal gears are being positioned, as explained above. The shaft 190 for the total control plate printing mechanism drives an indicator gear, similar to the gear 177 but with the external teeth 177 omitted and having mounted thereon an arcuate band 193 (Fig. 4) having the various characters of the type wheels 186 printed on the face thereof, which characters are visible through an indicator opening 194 in the cabinet. There are also indicating wheels for the amount banks and for the transaction banks, which are visible through the opening 194, for indicating the amount and type of the previous transaction.

*Transaction keys*

The first row of transaction keys 62 (Figs. 1 and 3) control the selection of the balance totalizer and the two totalizers on the upper or #1 line. All of these keys are motorized or operating keys with the exception of the Credit total key, which must be used in connection with the Total bill key 56 in order to operate the machine to print a credit total. The keys 62 control a transaction differential mechanism, which selects the totalizers corresponding to these keys and which positions the printing wheels for printing symbols corresponding to said keys. As this differential mechanism is similar to the amount differential mechanism described above and is fully disclosed in the patents referred to hereinbefore, only a brief description thereof will be given.

Depressing one of the keys 62 rocks a zero stop pawl 196, for the first transaction bank, out of the path of the forward end of a spider 197 pivoted on a hub 198 of a differential arm 199 turnably supported by a stud 200 extending between identical support plates 201, only one here shown, mounted on the rods 74 and 75. The spider 197 has, in the forward end thereof, a slot which engages a stud 202 in a differential latch arm 203 pivotally mounted on the arm 199, and said arm, in cooperation with an arm 204 also pivoted to the arm 199, supports a transaction differential latch 205 for horizontal shifting movement. The latch 205 has a foot-shaped rearward extension 206 which cooperates with a shoulder on a differential operating segment 207 pivoted on the stud 200 and connected by a link 208 to a cam lever 209 fulcrumed on a stud 210 supported by the plate 201. Extensions of the lever 209 carry rollers 211 and 212, which cooperate respectively with the peripheries of companion plate cams 213 and 214 secured on the main shaft 51.

Depression of any one of the keys 62 moves the lower end thereof into the path of a forward extension 215 of the latch arm 203, whereupon operation of the machine causes the cams 213 and 214, which, as previously explained, make one clockwise revolution in adding and subtracting operations, to rock the lever 209 and the segment 207 first in a clockwise direction (see space 2, Fig. 36). Clockwise movement of the segment 207, by means of the shoulder thereon, in cooperation with the foot-shaped extension 206, carries the latch 205, arm 199, and spider 197 clockwise in unison therewith until the extension 215 of the latch arm 203 engages the stem of the depressed key 62. This rocks the arms 203 and 204 counterclockwise to shift the latch 205 forward to disengage the foot 206 from the shoulder of the segment 207 and to engage a rounded nose 216, on an extension of said latch 205, with the proper one of a series of alining notches 217. The notches 217 correspond to the different positions of the first transaction differential and are cut in a plate 218 supported by extensions of the partition plate 201. This positions the transaction differential mechanism in proportion to the depressed transaction keys 62 without interfering with the oscillating movement of the segment 207 and connected parts. After the latch 205 is disengaged from the shoulder of the segment 207, an arcuate surface 219, on the periphery of said segment, in cooperation with the sole of the foot 206, locks said latch in the corresponding notch 217 to retain the differential mechanism in set position.

When the lever 209 (Fig. 3) nears the terminus of its initial movement clockwise, a roller 220 carried thereby engages a rounded surface 221 or a beam 222 pivotally mounted on the lever 199 and forces an arcuate surface on the upper edge of said beam into contact with an undercut portion of the hub 198, to position said beam in proportion to the depressed transaction key 62. The rearward end of the beam 222 is bifurcated to embrace a stud 223 in a link 224 pivotally connected at its upper end to a gear sector 225 secured to one of the nested tubes 105 rotatably supported by the shaft 106, and said link is pivotally connected at its lower end to a printer positioning segment 226 secured on the shaft 108. The link 224 transmits the differential positioning of the beam 222 to the sector 225 and segment 226, said sector 225 being adapted to control mechanism which shifts the sets of wheels of the #1 and #2 totalizers, corresponding to the depressed key 62, into alinement with the corresponding amount actuators 71 (Fig. 2).

The segment 226 (Fig. 3) is connected by a link 227 to a gear sector 230, the teeth of which mesh with the external teeth of an external-internal drive gear 231 similar to the gear 177 (Fig. 5). The gear 231 is operatively connected to the type wheels and the indicators for the first transaction bank by means of internal teeth therein, in cooperation with drive pinions mounted on a square shaft similar to the shaft 190, and other internal-external gears.

The mechanism described immediately above transmits the differential positioning of the beam 222 to the type wheels and indicators for the first transaction bank, whereupon operation of the printing mechanism causes a symbol characteristic of the depressed transaction key 62 to be printed in the desired columns of the statement slip.

Figure 3:
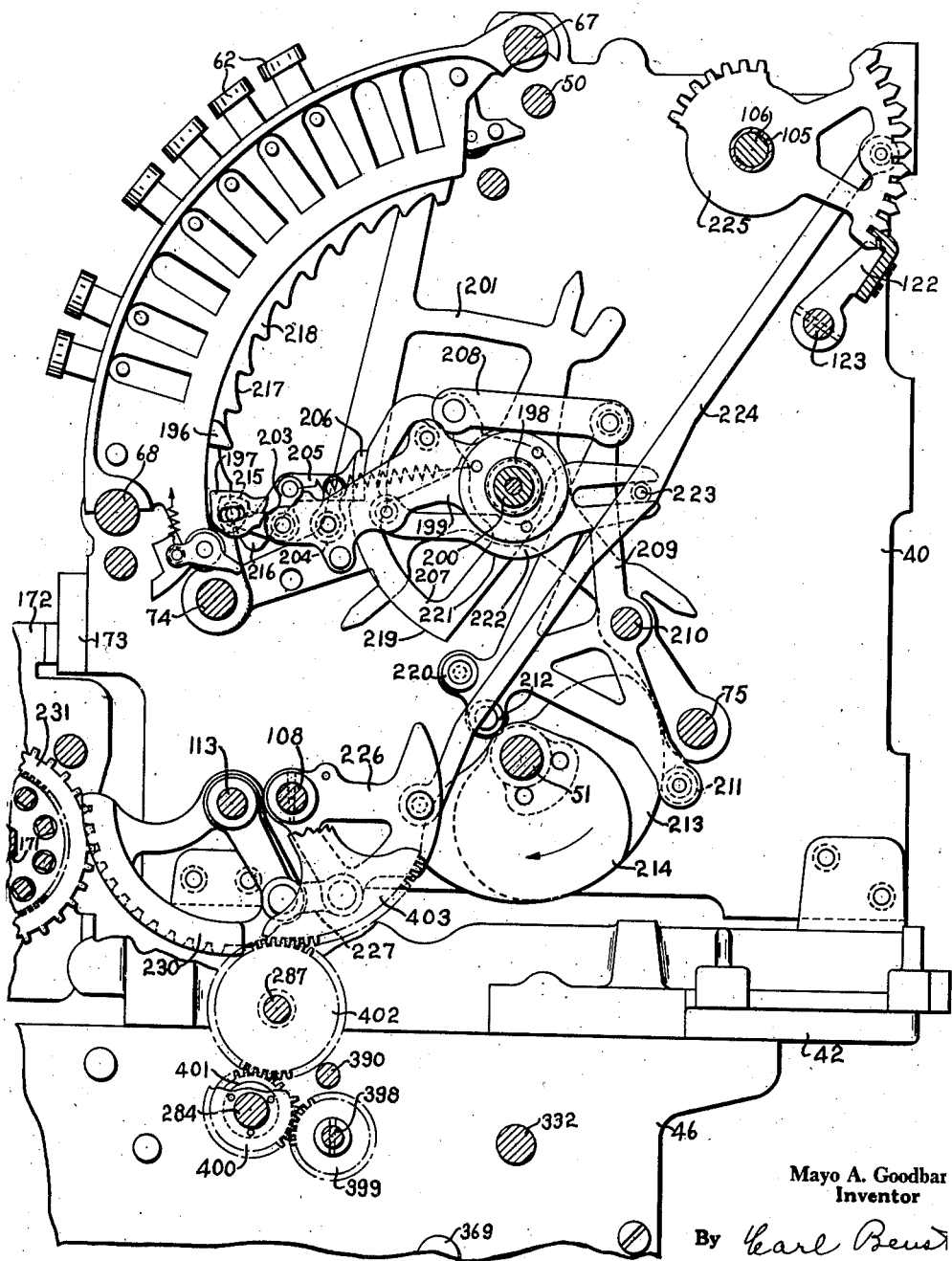
Fig. 3 is a cross sectional view of the machine taken just to the right of the first transaction bank, showing said bank and the differential mechanism associated therewith.
Figure 6:
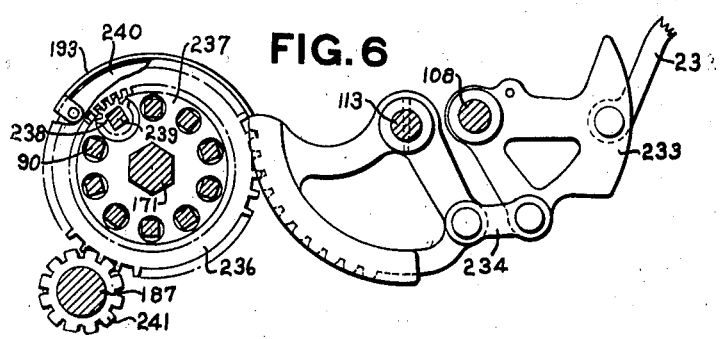
Fig. 6 is a detail view of a part of the differential mechanism for the second transaction bank.

Mechanism similar to that shown in Fig. 3 and described above is provided for the second row of transaction keys 63 (Fig. 1), and enough of this mechanism is shown in Fig. 6 to properly illustrate how the positioning of the second transaction differential mechanism is transmitted to the shaft 113 and to the type wheels and indicator mechanism for the second transaction bank.

A link 232 (Fig. 6), similar to the link 224 (Fig. 3) and connected to the differential mechanism for the second transaction bank in exactly the same manner as said link 224 is connected to the differential mechanism for the first transaction bank, is pivotally connected at its lower end to a segment 233 free on the shaft 108. A link 234 connects the segment 233 to a gear sector 235 secured on the shaft 113 and having teeth which mesh with the external teeth of an external-internal gear 236. The internal teeth of the gear 236 bear on the periphery of a disk 237 supported by the hexagonal rod 171, and said internal teeth mesh with and drive a pinion 238 and a square shaft 239, upon which the pinion is mounted.

The external teeth of the gear 236 mesh with and drive a second transaction bank type wheel 241 for one column of the record material, and the square shaft 239, by means of pinions similar to the pinions 238 and ring gears similar to the gear 236, drives type wheels similar to the type wheel 241, for the other columns of the record material. Likewise the shaft 239 is geared to an indicator gear 240 having mounted on the periphery thereof one of the bands 193 (Fig. 4) bearing data thereon, which is similar to the data on the type wheels 241 and is visible through the opening 194 in the cabinet 49.

Statement slip feeding mechanism

Figs. 31A and 31B and Figs. 32A and 32B illustrate respectively facsimiles of six-line and five-line bills or statement slips 243 and 244 prepared on the machine embodying the instant invention. Each of these statement slips has a main portion called a "customer's bill" and three detachable portions or stubs, referred to respectively as "cashier's stub," "office stub," and "accounting stub," said stubs being perforated to facilitate detachment. The five and six lines of the statement slips 244 and 243 are used for the printing of the amounts of the different items listed on the customer's bill and do not in either case include a total of these amounts, said total being printed in the last of a series of operations comprising the computation of a complete bill. Each of the four portions of the statement slips has a lined field or column therein, in which the printing of the various items and totals therefor takes place. The different lines in the fields or columns are indicated numerically on the customer's bill and on the cashier's stub. In addition to the printing of the items on the six-line statement slip 243, the number of the "additional local messages" is also printed to the left of the lined field on the customer's bill, the office stub, and the accounting stub. The office stubs and the accounting stubs of the five- and six-line bills or statement slips have, in addition to the lined field for the items and the total thereof, other lined fields for the entering of various data pertaining to the particular accounts.

Primarily, the machine embodying this invention is arranged for preparing a six-line statement slip, such as that shown in Figs. 31A and 31B, and when it is desired to prepare a five-line statement slip, the shifting of a manipulative lever from six-line position to five-line position changes the functioning of the statement slip feeding mechanism so that five-line slips may be printed. It will be noted, in the five-line statement slip, that the second item of the six-line statement slip (Additional local messages) is omitted, and in order to prevent an objectionable space from being left between the first and third items of the five-line slip, the feeding mechanism is arranged to shift the printing of all the items, with the exception of the first item, upwardly one line-space to eliminate this objectionable space.

The movement of the statement slip to first line printing position is controlled by a reciprocable slide, which actuates the statement slip feeding mechanism at this time. The movement of the slip to all other printing positions is controlled by the differential mechanism for the second transaction bank, and when other than the first line of the slip is selected for printing, the feeding mechanism is disconnected from the slide and connected to the differential mechanism for the second transaction bank. The keys of the second transaction bank, certain keys in the first transaction bank, and a total key are line-selecting keys and control the positioning of the second transaction differential and the statement slip feeding mechanism in proportion thereto, to select the corresponding lines of the statement slip. It is therefore evident that, when the feeding mechanism is connected to the second transaction differential, the statement slip may be spaced back and forth from one line to another, without regard to the order or sequence of said lines, under control of the various line-selecting keys.

The above type of line-selecting mechanism is believed to be new and to constitute a decided advancement in the art.

The operator presents the statement slips 243 one at a time (Figs. 12, 13, 15, and 33) to the printing mechanism by inserting said statement slips into a throat formed by a guide bar 245 and a table 246, which guide said statement slips first between the column-printing type wheels 186 and 241 and their associated hammers 188, then between statement slip feed disks or rollers 247 and their associated pressure rollers 248, and finally into contact with two statement slip stops 250, only one here shown. The stops 250, together with the feed rollers 247, are secured on a shaft 251 journaled in the frames 43 to 46. The table 246 is mounted on the top edges of the frames 43 to 46 and the forward edge of said table is supported by brackets 252, only one here shown (Fig. 12), secured to the forward edges of said frames. The guide bar 245 is secured on a shaft 253 journaled in brackets supported by the table 246. Each of the pressure rollers 248 is mounted in a yoke member 254 pivoted on a stud 255 secured in a bracket 256, in turn secured to the front edge of the base plate 42. A torsion spring 257 encircles the stud 255 and is tensioned to urge the yoke 254 counter-clockwise to maintain a projection 258 thereof in engagement with the lower edge of the bracket 256, to maintain the rollers 248 in proper relationship to the periphery of the corresponding feed rollers 247. A guide plate 259 passes between the upper ends of the stops 250 and the brackets 254 to further assist in guiding the statement slips 243 between the pressure rollers and the feed rollers and into engagement with said stops 250. When the machine is at rest, flat surfaces 260 on the feed rollers 247 face upwardly, as here shown, to provide the necessary clearance to permit the statement slips to be inserted between said feed rollers and their associated pressure rollers 248 and into engagement with the stops 250.

The relation of the first and second lines of the statement slip 243 to the printing mechanism is indicated by vertical arrows throughout the various views of the feeding mechanism included in Figs. 12 to 26.

Figure 16:
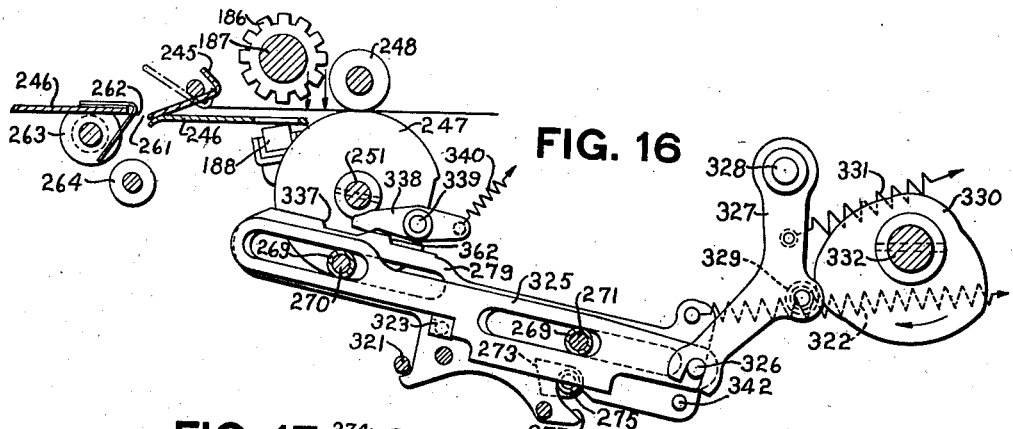
Fig. 16 is a side elevation showing the mechanism of Fig. 13 in partially moved position, said mechanism being shown in home position in Fig. 13.

In case the first line of the slip is selected for printing in the first operation of the machine, said slip is overfed, as shown in Fig. 16, so that the lower edge thereof is moved safely beyond an opening 261 in the table 246, after which the guide 245 is rocked counter-clockwise from the dot-and-dash line position, as shown in Fig. 16, to the full-line position, to guide said statement slip into the opening 261 upon ejection thereof. After the printing of the statement slip has been completed, the feed rollers 247, in cooperation with their pressure rollers 248, feed said slip forwardly, and the lower edge thereof is guided by the guide 245 through the opening 261 and, with the assistance of another guide 262, guides the lower edge of said slip between a set of ejecting rollers 263 and their corresponding pressure rollers 264. The ejecting mechanism then functions to invert the finished statement slip and deposit it face down in a suitable receptacle (not shown) located at the front of the machine. This inverting of the statement slips as they are ejected insures that they are stacked in proper sequential order.

The guide 245 remains in the full-line position (Fig. 16) until the slip is ejected, to close the throat to the printing mechanism and thus prevents the insertion of another slip until the one in the machine has been completed. During the ejecting of the slip, the guide 245 is returned to the dot-and-dash or open throat position.

Referring to Figs. 12 and 15, secured on the shaft 251 is a gear 267, which meshes with teeth on the upper edge of a rack 268 reciprocably mounted by means of two parallel slots therein, in cooperation with rollers 269 mounted on studs 270 and 271 secured in the frame 44. The rack 268 has a stud 272 which pivotally supports a lever 273 having rollers 274 and 275 mounted on opposite sides thereof, which rollers cooperate with locking and camming slots 276 and 277 in a rack 278 and a first line control slide 279 (Fig. 13) respectively. The rack 278 and slide 279 are reciprocably mounted, by means of parallel slots therein in cooperation with the rollers 269, in the same manner as the rack 268. The slots 276 and 277, in cooperation with the rollers 274 and 275, provide means for locking either the rack 278, which is controlled by the second transaction bank, or the slide 279, which controls the first line printing position, to the rack 268 (Fig. 15). The rack 268 in turn controls the movement of the shaft 251 and the disks 247 to properly position the different lines of the statement slip 243 in relation to the printing mechanism.

*Connection of the feeding mechanism to the second transaction bank*

The rack 278 (Figs. 18, 22, and 26) is connected to the second transaction bank by teeth on the upper edge thereof, which mesh with a pinion 280 free on a shaft 281 journaled in the printer framework, said pinion being secured to a segmental gear 282 which meshes with a gear 283, secured on a second transaction bank control shaft 284, also journaled in the printer framework. Also secured on the shaft 284 (Fig. 28) is a gear 285, which meshes with a gear 286 rotatable on a stud 287 carried by a plate 288 secured to the right frame 41 and the base plate 42. The right-hand end of the stud 287 is likewise supported by a plate 289 secured on studs in the frame 46. The gear 286 meshes with a segmental gear 290 (see also Fig. 29) free on the shaft 113 and having similar camming slots 291 and 292 therein which cooperate respectively with studs 293 and 294 carried by a shifting plate 295 slotted to straddle the shaft 113. The left-hand ends of the studs 293 and 294 extend into parallel driving slots 296 and 297 in a driving plate 298 secured on the shaft 113.

The right-hand ends of the studs 293 and 294 carry, respectively, rollers 299 and 300, which cooperate with the periphery of a plate cam 301 free on the shaft 113 and having integral therewith a gear 302 (Fig. 28) which meshes with a gear sector 303 free on a stud 304 in the plate 288. A link 305 connects the gear sector 303 to a shifting lever 306 free on a stud 307 in the plate 288 and having, in an enlarged portion of the upper end thereof, an arcuate slot 308, each end of which terminates in a vertical locking notch. The slot 308 and the associated locking notches are arranged to cooperate with a locking stud 309 in one arm of a detent 310 (Fig. 30) free on a stud 311 in the right frame 41. The two vertical notches in the arcuate slot 308, in cooperation with the stud 309, determine the two positions of the lever 306, said lever in turn controlling the printing of five- and six-line statement slips, as will be explained later. A spring 312 urges the detent 310 clockwise to normally maintain the stud 309 in one of the vertical notches to prevent accidental displacement of the lever 306. As here shown, the lever 306 is in six-line printing position, and to move said lever to five-line printing position it is necessary to depress an upward projection 313 of the detent 310, which extends through an opening in the top of the cabinet 49, to rock said detent 310 counter-clockwise, against the action of the spring 312, to disengage the stud 309 from the rearward locking notch and to aline said stud with the arcuate slot 308. After this, the lever 306 may be moved clockwise to five-line position through the medium of a fingerpiece 314 thereof, which extends through the same opening as the projection 313.

While the lever 306 is being moved from one position to another, the slot 308, in cooperation with the stud 309, retains the detent 310 in depressed position to hold a projection 315 thereof in the path of an extension 316 of an arm 317 secured on the right-hand end of the key lock shaft 50, to prevent clockwise releasing movement of said key lock shaft when the lever 306 is out of either of its positions. A depending finger 318 of the detent 310, in cooperation with an annular groove in a stud 319 in the frame 41, prevents lateral displacement of said detent and maintains the projection 315 in alinement with the extension 316. After the lever 306 has been moved clockwise to five-line printing position (Fig. 28), the release of the detent 310 permits the stud 309 to engage the forward notch in the slot 308 to retain said lever in its five-line position.

Moving the lever 306 (Figs. 28, 29, and 30) from six-line printing position, as here shown, to five-line printing position rocks the segment 303 counter-clockwise to rotate the gear 302 and the cam 301 in a clockwise direction. Clockwise movement of the cam 301, in cooperation with the rollers 299 and 300, shifts the plate 295 downwardly, causing the studs 293 and 294, guided by the slots 296 and 297 in the driving plate 298, and in cooperation with the camming slots 291 and 292, to rock the segment 290 clockwise in relation to said driving plate 298. This movement of the segment 290, by means of the idler gear 286, drives the gear 285, shaft 284, and pinion 283 (Figs. 15, 18, 22, and 26) also a slight distance clockwise. Clockwise movement of the pinion 283 drives the segment 282 and pinion 280 counter-clockwise to advance the rack 278 the equivalent of one line-space, so that the printing of all items, controlled by the differential of the second transaction bank, will be moved upwardly one line-space in order that the omission of the second item, in the preparation of five-line statement slips, will not leave a blank space between the first and third items on said slip. The manner in which the mechanism described above controls the printing of five-line statement slips will be described more fully later herein.

Operation of the first line control slide

The first line control slide 279 is normally maintained in its rearward position, as shown in Fig. 13, by a spring 322, and said slide carries a square stud 323 adapted to cooperate with an abrupt surface 324 on a driving slide 325, slidably mounted by means of parallel slots therein, in cooperation with the rollers 269 on the studs 270 and 271. The slide 325 carries a stud 326, straddled by the bifurcated end of a cam lever 327 free on a stud 328 in the frame 44 (Fig. 12). The lever 327 carries a roller 329 which is normally maintained in contact with the periphery of a plate cam 330 by a spring 331 tensioned between said lever 327 and a stud in the frame 44. The cam 330 is secured on a shaft 332, journaled in the frames 43 to 46 inclusive (Fig. 33), and said shaft has a gear 333 (Fig. 28) secured on the right-hand end thereof, which meshes with an idler gear 334 pivoted on a stud 335 in the plate 288. The idler gear 334 in turn meshes with a gear 336 secured on the right-hand end of a stub shaft 320 journaled in the plate 288 (Fig. 28). The shaft 320 is in axial alinement with the main cam shaft 51, to which it is connected by a clutch mechanism (not shown) which functions in total-printing operations to disconnect the stub shaft 320 from the main shaft 51 during the first cycle of said total-printing operations.

It will be recalled, by referring to Fig. 2, that the main shaft 51 makes one clockwise revolution in adding and subtracting operations and two such revolutions in total and sub-total printing operations. In adding and subtracting operations, the shaft 320 (Fig. 28) remains clutched to the shaft 51 and consequently the shaft 332, which controls the functioning of the printing mechanism, moves in unison with said main shaft 51 one clockwise revolution. In total and sub-total printing operations, the shaft 320 is declutched from the main shaft 51, at the beginning of machine operations, and remains thus declutched until after the first cycle of such operations has been completed and the shaft 51 has finished its first clockwise revolution. Before the shaft 51 begins its second revolution, the shaft 320 is clutched thereto and revolves the printer shaft 332 in unison therewith, during the last cycle of total or sub-total printing operations, to record the sub-total or total on the record material. This disabling of the printer operating shaft 332 during the first cycle of total and sub-total printing operations prevents the functioning of the printing mechanism during said first cycle, as such functioning would cause an erroneous amount to be recorded.

Clockwise movement of the shaft 332 and cam 330 (Fig. 13) moves the slide 325 forwardly, causing the shoulder 324 to engage the stud 323 to carry the slide 279 forwardly in unison therewith. The movement of the cam 330 is illustrated graphically in space 5 of the chart, Fig. 36. The slide 279, by means of the slot 277 therein, in cooperation with the roller 275 (Figs. 13 and 15) carries the rack 268 forwardly in unison therewith to rotate the feed rollers 247 clockwise to feed the statement slip 243 (Fig. 12) rearwardly. Forward movement of the slide 279 causes a shoulder 337 on the upper edge thereof to by-pass the end of a retaining pawl 338 free on a stationary stud 339 and urged counter-clockwise by a spring 340. The slide 279 continues its forward movement to the position shown in Fig. 16, to overfeed the statement slip 243 a slight distance beyond the second line to insure that the lower edge of said slip is well beyond the opening 261 when the guide 245 is moved from the dot-and-dash position to the full line position.

Figure 18:
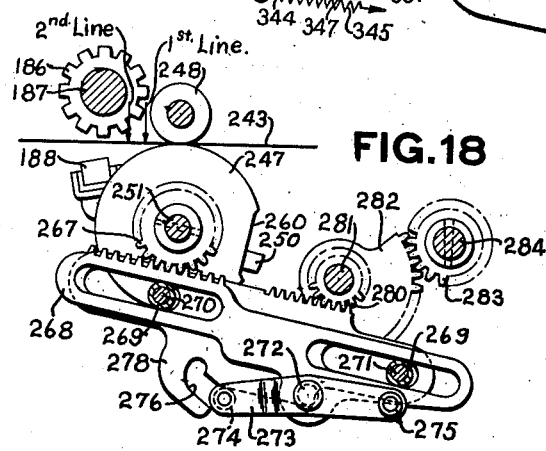
Fig. 18 shows the mechanism of Fig. 15 in partially moved position, said mechanism being shown in home position in Fig. 15.
Figure 19:
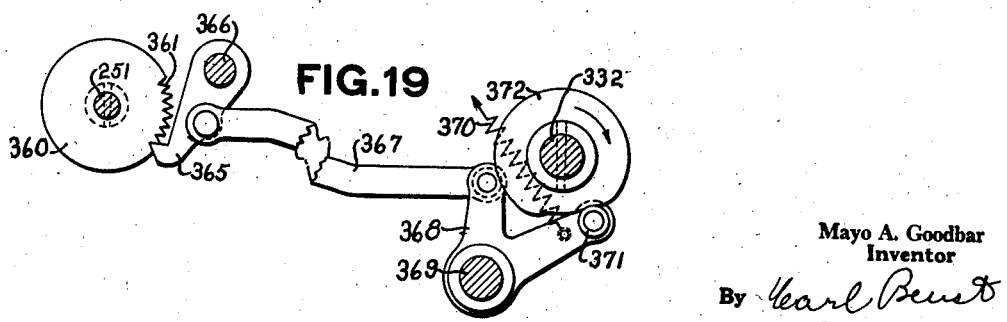
Fig. 19 is a detail view of the alining mechanism for the bill feeding shaft.

In the operation when the slide 279 is driving the rack 268 to first printing line position, the second transaction differential is stopped in the position corresponding to "Auto keys 7 & 16" (Fig. 1), and the rack 278 is positioned in its farthest position to the left as shown in Figs. 15 and 18. With the rack 278 in this position, the rack 268 and the roller 274 move relatively thereto from the positions shown in Fig. 15 to those shown in Fig. 18, and it is seen from a comparison of Figs. 15 and 18 that the roller 274 coacting with surface 364 on the rack 278 locks the roller 275 in the slot 277 in the slide 279 throughout the movement of this slide.

Continued rotation of the cam 330 (Figs. 20, 22, and 23) permits the springs 322 and 331 to return the slides 279 and 325 and the rack 268 rearwardly a slight distance, until the pawl 338 engages the shoulder 337 to position the slide 279 and rack 268, as shown in Figs. 22 and 23, to back-feed the statement slips 243 to bring the first printing line thereon into register with the printing mechanism. Operation of the printing mechanism causes the amount set up on the keys 52 (Fig. 1) to be printed on the first printing line of the statement slip 243, including each of the columns of the four different portions thereof.

In printing an item on the first line of the statement slip, as outlined above, it is assumed that the proper ones of the amount keys 52 (Fig. 1) have been depressed, and that either the Local service multiple line key 63, in the second transaction row, or the Local service single line key 62, in the first transaction row, has been depressed, as these keys select the first printing lines of the statement slips 243 and 244 shown in Figs. 31A, 31B, 32A, and 32B, which lines, as indicated on the customer's bill portions of said slips, are provided for local service charges. The only difference between the Local service keys 62 and 63 is that the former causes the slip to be ejected immediately after the local service charge has been printed thereon, as will be more fully explained later.

After rearward movement of the slide 279 has been terminated by the pawl 338 (Fig. 23), the slide 325 continues to move independently thereof back to home position, in which position a shoulder 341 thereon engages a stud 342 in said slide 279.

Referring to Figs. 12, 14, 17, 21, and 28, the slide 279 carries a stud 343, which pivotally supports a coupling pawl 344 urged counter-clockwise by a spring 345 to cause a roller 346 carried thereby to cooperate with a flat surface 347 on the bottom edge of a control lever 348 fulcrumed on the stud 270. A hook-shaped extension of the lever 348 has mounted thereon a roller 349, normally maintained in engagement, by a spring 359, with the periphery of a plate cam 350 secured on the #2 transaction shaft 284.

A tooth 351 on the pawl 344 is arranged to engage a shoulder 352 on a booster slide 353, reciprocably mounted by means of parallel slots therein, in cooperation with the rollers 269 on the studs 270 and 271. This booster slide 353 is used in certain operations to give the slide 279 an additional forward movement to insure that the connection between the slide 279 and the rack 268 is broken and that the rack 268 will be connected to the rack 278 for positioning thereby. The slide 353 has a stud 354 which is embraced by the bifurcated downward end of a cam lever 355 fulcrumed on the stud 328 and urged counter-clockwise by a spring 356 to normally maintain a roller 357 carried thereby in contact with the periphery of a plate cam 358 secured on the shaft 332. The movement of the cam 358 is depicted graphically in space 6 of the chart, Fig. 36.

Figure 17:
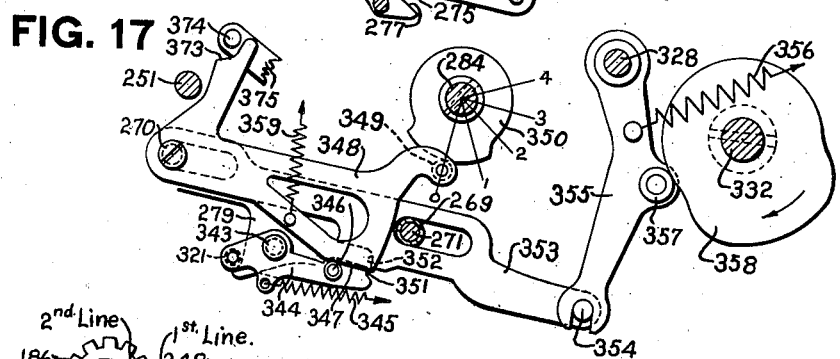
Fig. 17 shows the mechanism of Fig. 14 in partially moved position, said mechanism being shown in home position in Fig. 14.

Depression of either of the Local service keys 62 or 63 (Fig. 1) to initiate a machine operation and select the first line of the slip for printing causes the second transaction differential to position the cam 350, as shown in Figs. 14, 17, and 21, so that the high portion thereof is opposite the roller 349. This maintains the lever 348 in the clockwise position here shown to hold the surface 347 in the path of the roller 346. When the parts are in home position, as shown in Fig. 14, a flat surface on the top of the pawl 344 is maintained in contact with an undercut surface on the slide 353. It will be noted that at this time the roller 346 is out of the path of the surface 347 on the lever 348.

Positioning of the slide 279, during the entering of the local service item upon the first line of the statement slip, causes the roller 346 to ride onto the surface 347 of the lever 348, thereby slightly depressing said pawl, against the action of the spring 345, to move and maintain the tooth 351 thereof out of the path of the shoulder 352 on the slide 353. This prevents said tooth 351 from engaging said shoulder 352, when the parts are in the positions shown in Fig. 17, so that forward movement of the slide 353, under the influence of the cam 358, from the position shown in Fig. 17 to the position shown in Fig. 21 will not be imparted to the slide 279 during the first line printing operation.

*Control of line selecting by second transaction bank*

Depressing the Additional messages key 63 of the second transaction row (Fig. 1), in the second operation, selects the second line of the statement slip, which, it will be noted by referring to Figs. 31A and 31B, is provided for the recording of additional local messages. The depressed key 63 causes the differential mechanism for the second transaction bank to move the rack 278 to its farthest position to the right as shown in Fig. 26 and to position the cam 350, as shown in Fig. 25, to bring the low portion of the periphery thereof opposite the stud 349, thus permitting the lever 348 and the pawl 344 to rock counter-clockwise under influence of their springs, to move the tooth 351 (Fig. 17) into the path of the shoulder 352 prior to forward movement of the booster slide 353. The engaging of the pawl 344 with the shoulder 352 occurs when the slide 279 is in approximately the position shown in Figs. 16 and 17, at which time said pawl 344 is free to move into the path of the shoulder 352, as explained above. The engaging movement of the pawl 344 is limited by a stud 321 in said pawl, in cooperation with an extension of the slide 279.

Rotation of the cam 358 (space 6, Fig. 36) rocks the lever 355 clockwise to move the slide 353 forwardly, which movement is transmitted, by the shoulder 352 and the pawl 344, to the slide 279 to move said slide in unison therewith to the position shown in Figs. 24 and 35. During this additional forward movement of the slide 279, in the second operation, the camming action of the slots 276 and 277 (Figs. 24 and 26), in cooperation with the rollers 274 and 275 on the lever 273, disengages the roller 275 from the slot 277 in the slide 279, and simultaneously engages the roller 274 with the slot 276 in the rack 278, as shown in Fig. 26. This shifts the control of the movement of the feeding rack 268 from the first line control slide 279 to the rack 278, which rack, as previously explained, is controlled by the differential mechanism of the second transaction bank and at this time is positioned under control of the depressed Additional messages key 63 to the position as shown in Fig. 26, to move the second line of the statement slip 243 opposite the printing mechanism.

After the slide 279 has been disconnected from the rack 268, as explained above, said slide returns rearwardly with the slide 353, under influence of spring 322 and at a time controlled by the cam 358 (space 6, Fig. 36), until a shoulder 362 on the upper surface thereof engages the retaining pawl 338, as shown in Figs. 10 and 27. The slide 279 remains in the position shown in Figs. 10 and 27 until the last or slip ejecting operation is performed, at which time the pawl 338 is released and the slide 279 returns to home position under influence of the spring 322 and the cam 330, as will be explained fully later. A finished surface 363 (Fig. 24) on the lower edge of the slide 279, in cooperation with the roller 275, retains the roller 274 in engagement with the slot 276 (Fig. 26) when said slide 279 is held in its forward position by the pawl 338 and shoulder 362, and a similar surface 364 (Fig. 15) on the rack 278, in cooperation with the roller 274, retains the roller 275 in engagement with the slot 277 when the slide 279 is in any position except the positions shown in Figs. 24 and 35.

In printing the remainder of the items upon the statement slip, any or all of the remaining keys 63 may be used, and, inasmuch as the slip feeding mechanism is now connected to the differential mechanism of the second transaction bank, the statement slip will be positioned in proportion to the positioning of said differential mechanism by said keys 63.

All of the keys 63 select the plus side of the balance totalizer. However, if a particular account should be credited with an amount, such as an over-payment for some service, the Other credits key 62 (Fig. 1) is used instead of the Other charges key 63. In a like manner, if a particular account should be credited with an over-payment of a previous bill, the Balance due credit key 62 is used instead of the Balance due debit key 63. The Other credits key and the Balance due credit key break the latch of the second transaction differential in exactly the same positions as their corresponding keys in the second transaction bank, and in addition select the subtract side of the balance totalizer, so that these credits will be subtracted from the subscriber's account. With the exception of the Local service key 63, all of the keys 63 and the Other credits and Balance due credit keys 62 control the position of the cam 350 (Fig. 25) so that the low portion thereof is opposite the roller 349.

While, in the particular system outlined herein, it is logical to enter the amounts of the different items in the order in which these items are listed on the statement slip 243 (Figs. 31A and 31B), still the present feeding mechanism has been designed to take care of many possible variations from this rule. For example, it is not compulsory to select the first line in the first operation, but any line may be selected in the first operation. Neither is it necesary to enter the amounts in any particular order, as, with one exception, the amounts of the different items may be entered in any order desired. In other words, the amount of the last item may be entered first, then the amount of the second item may be entered, and so on. This flexibility of operation of the slip feeding mechanism admirably adapts the machine of this invention not only to the particular business system outlined herein, but also to many other business systems.

The exception mentioned above is this:

If it is desired to print upon the first line of the statement slip, this must be done in the first operation, as it is impossible to return to this line after the control of the line feeding mechanism has been shifted from the slide 279 to the second transaction bank. This is clearly illustrated in Fig. 27, which shows said slide 279 in the position to which it was moved in the second operation to shift the control of the statement slip feeding mechanism to the second transaction bank, and in which position it is retained by the pawl 338 in cooperation with the shoulder 362 until the statement slip is ejected. It is clear to see that, as long as said slide 279 is retained in the position shown in Fig. 27, it is impossible to return the slip to the first line printing position.

It is to be borne in mind that it is not necessary to depress the Local service key 63 (Fig. 1) in the first item printing operation in the preparation of either five- or six-line statement slips. In fact, any of the keys 63 in row 2 may be depressed in the first operation, or the Other credits key 62 and the Balance due credit key 62, in row 1, may be depressed in the first operation, and the statement slip will be moved to the line corresponding to the depressed key in the first operation. The obvious reason for this is that when any of the above keys, except the Local service key 63, is depressed, the cam 350 (Figs. 17, 25, and 35) is positioned by the second transaction differential, so that the low portion of the periphery thereof is opposite the roller 349, and, as this positioning takes place prior to forward movement of the booster slide 353 and after the first line control slide 279 has been positioned, as shown in Figs. 16 and 17, the pawl 344 immediately engages the shoulder 352. Initial movement forwardly of said slides 353 and 279 (Fig. 35) immediately shifts the control of the line-spacing mechanism from the slide 279 to the rack 278 (Fig. 26), which is in turn controlled by the second transaction bank, and, as a result, the statement slip is positioned to the line corresponding to the depressed key in the first operation.

Likewise it is to be remembered that, after the line-spacing mechanism has been connected to the second transaction bank differential mechanism, it is not necessary to depress the line-selecting keys of the first or second transaction banks in sequence or in any particular order in order to have the statement slip space correctly. In other words, if the Balance due debit key was depressed, in a previous operation, to enter the amount of that item on the sixth line of the statement slip, and afterward it is discovered that an "additional messages" item has been inadvertently omitted, this item may then be set up on the amount keys and entered in the machine totalizers and printed upon the second line of the statement slip by depressing the Additional messages key 63.

Statement slip alining mechanism

Mechanism is provided for alining the shaft 251 (Fig. 12) and feed rollers 247 and holding them against displacement while printing is being effected. This mechanism includes a disk 360 (Fig. 19) secured on the shaft 251 and having teeth 361 corresponding to the various lines of the statement slip 243 and adapted to be engaged by the tooth of an alining pawl 365 free on a rod 366 supported by the printer framework. A link 367 connects the pawl 365 to one arm of a lever 368 free on a shaft 369 supported by the printer framework. A spring 370 urges the lever 368 counter-clockwise to normally maintain a roller 371 carried thereby in engagement with the periphery of a plate cam 372 secured on the shaft 332, which, as previously explained, makes one clockwise revolution during each machine operation.

The alining mechanism described above is shown (Fig. 19) in the position which it occupies during operation of the printing mechanism. In other words, the only time the pawl 365 is engaged with one of the notches 361 in the disk 360 is during the operation of the printing mechanism, to hold the statement slip against displacement at this time. At all other times the pawl 365 is disengaged from the notches 361 in the disk 360 and remains disengaged therefrom at the end of the machine operation. Movement of the pawl 365 and cam 372 is depicted graphically in space 4 of the time chart (Fig. 36).

After the line-feeding mechanism has positioned the statement slip, so that the selected line thereon is opposite the printing mechanism, the cam 372 causes the pawl 365 to engage the V-shaped notch 361 in the disk 360, corresponding to the selected line of the statement slip, to hold said statement slip against displacement during operation of the printing mechanism. Immediately after the printing mechanism functions, the cam 372 disengages the pawl 365 from the disk 360, and said pawl remains disengaged at the end of the machine operation. When the shaft 251 and feeding rollers 247 are in home position, as shown in Fig. 12, all of the notches 361 (Fig. 19) are moved out of cooperative relationship with the pawl 365. It is unnecessary to aline the shaft 251 in home position, as the printing mechanism never functions at this time, but functions only when said shaft is in one of its printing positions and the corresponding aligning notch 361 is opposite the pawl 365.

As previously explained, the shaft 332 remains stationary during the first cycle of a total-printing operation and functions only during the last cycle of said operation to aline the shaft 251 prior to the printing of said total.

Statement slip ejecting mechanism

The Local service single line key 62, the Eject key 62, the Total bill key 56, and the Clear net key 58 all cause the slip-ejecting mechanism to function.

The Local service key 62 is used when the "local service" item is the only item to be entered on the statement slip, and said key positions the second transaction differential in the same position as the Local service multiple line key 63 and functions exactly the same as said key to select the first line of the statement slip for printing of the "local service" item. After the "local service" item has been printed, the Local service key 62 causes the slip to be ejected, turned face down, and deposited in a receptacle (not shown) in the front of the machine.

The Total bill key 56 controls the second transaction bank differential to move the racks 278 and 268 to the position corresponding to the "Total bill pos. 10" (Fig. 1) to select the last line on the slip for printing a total of all the items thereon, and in addition causes the ejecting mechanism to function to eject the slip thereafter.

The Eject key 62 does not control the second transaction differential or the printing mechanism, but causes the ejecting mechanism to function to eject the slip, when desired.

When the ejecting mechanism functions, the guide 245 is restored from the full line or closed throat position (Fig. 16) to the dot-and-dash line or open throat position, so that another slip may be inserted in the machine. The Clear net key 58 operates the ejecting mechanism, in proof operations, for the sole purpose of restoring the guide 245 to open throat position.

Referring now to Figs. 10, 11, 12, and 27, an upward extension of the control lever 348 has a camming surface 373 thereon, which terminates in a finger, said camming surface adapted to cooperate with a stud 374 in a lever 375, free on the shaft 281. The lever 375 carries a stud 376 which is normally maintained in engagement with a surface 377 on a crank 378, secured on the shaft 281, by a spring 379 tensioned between said lever and said crank 378. The lever 375 is connected by a hub 382 (Figs. 10, 11, and 27) to an arm 383, also free on the shaft 281 and having a surface 381 which is maintained in engagement with a stud in the pawl 338 by the spring 340, which is tensioned between said stud and a stud in the arm 383. A downward extension of the arm 383 pivotally supports selecting disk feelers 384 and 385 secured in fixed relation to each other, said feeler 384 having two feeling fingers adapted to cooperate with a control disk 386, and said feeler 385 having one finger adapted to cooperate with a control disk 387, both of said control disks being free on the shaft 284.

The disk 386 is controlled by the total control plate 64 (Fig. 4) and is connected thereto by gearing comprising a gear 388 (Fig. 27) secured to said disk 386 and meshing with a gear 389 secured on a shaft 390 journaled in the printer framework. Also secured on the shaft 390 (Fig. 4) is a gear 391, which meshes with a gear sector 392 secured on the right-hand end of a short shaft 393 journaled in the plate 288 and frame 41 and having secured on the left end thereof a segment 394 which meshes with a segment 395 secured to the arm 181. It will be recalled that the arm 181 is positioned in relation to the total control plate 64 through its connection to said plate by the link 182, and this positioning is transmitted, by the gearing just described, to the control disk 386 (Fig. 27).

The disk 387 (Figs. 10, 27, and 33), which is controlled by the first transaction bank, has secured on one face thereof a gear 396 which meshes with a gear 397 secured on a shaft 398 journaled in the printer framework. The shaft 398 also has secured thereon a gear 399 (Fig. 3), which meshes with a gear 400 free on the shaft 284 and having secured thereto a gear 401, which meshes with a gear 402 free on the stud 287, said gear 402 in turn meshing with a gear sector 403 secured on the shaft 108. Inasmuch as the segment 226 (Fig. 3) also is secured on the shaft 108, the positioning of said segment under influence of the differential mechanism for the first transaction bank is transmitted, through the gearing described above, to the disk 387.

As previously explained, depression of the Local service single line key 62 (Fig. 1) and the Eject key 62 causes the statement slip to be ejected and to effect this ejection, said keys control the position of the first transaction differential and the disk 387 so that notches in said disk, corresponding to these two keys, are moved into cooperative relationship with the one finger on the feeler 385 (Figs. 10 and 27). Inasmuch as the above-mentioned two keys are used when the total control plate 64 is in adding position, it is necessary to have a notch in the disk 386, corresponding to the adding position, for engagement by the right-hand finger on the feeler 384, which finger is adjacent to and directly in alinement with the one finger on the feeler 385.

In addition to the adding position of the total control plate 64, the disk 386 has notches therein corresponding to the Register non-add key 55 (Fig. 1), the Total bill key 56, and the Clear net key 58, so that the statement slip may be ejected when any one of these keys is depressed. The Total bill key 56 always causes the statement slip to be ejected; consequently the notch in the disk 386, corresponding to this key, cooperates with the upper or left-hand feeler finger on the feeler 384, and, as there is no corresponding finger on the feeler 385, the statement slip ejecting mechanism will always function when the Total bill key is depressed. The Register non-add key 55 is used in conjunction with the keys 62 and 63 when it is desired to print a duplicate slip without having the amount entered in the various storage totalizers corresponding to these keys, and, as the Local service single line key 62 and the Eject key 62 may be used when the Register non-add key 55 is depressed, it is necessary that the disk 386 have a notch therein corresponding to said key 55.

In proof reading operations, the Clear credits key 59 is used in conjunction with the Other credits key 62 and the Balance due credit key 62 to clear the storage totalizers corresponding to these two keys, and said Clear debits key 60 is likewise used in conjunction with the keys 63 to clear the storage totalizers corresponding to said keys 63. As the totals are cleared out of their respective storage totalizers, said totals corresponding to the Other credits and the Balance due credit keys are entered in the negative side of the balance totalizer and said totals corresponding to the keys 63 are entered in the positive side of the balance totalizer. As the above proof totals are entered in the balance totalizer, they are simultaneously printed, one after the other, on a proof slip. After all the storage totalizers have been cleared, the Clear net key 58 is depressed to clear the balance totalizer and print the net amount therein beneath the proof totals on the proof slip.

At the time the Clear net key 58 is used, there is no statement slip in the machine to be ejected, but, as the guide 245 (Fig. 16) is in the position here shown in full lines, the statement slip ejecting mechanism is caused to function to move the guide 245 from the full line position to the position here shown in dot-and-dash lines, and in full lines in Fig. 12, so that a statement slip may be placed in the machine. Inasmuch as the Clear net key 58 causes the statement slip ejecting mechanism to function, regardless of the position of the first transaction differential, the notch in the plate 386 corresponding to said key cooperates with the finger on the upper end of the feeler 384 to cause the slip ejecting mechanism to function regardless of the position of the first transaction control disk 387.

*Operation of feeler mechanism*

Referring to Fig. 10, secured on the shaft 281 is an arm 404 connected by a link 405 to a cam lever 406 free on a shaft 407 journaled in the printer framework. V-shaped arms of the lever 406 support, respectively, rollers 408 and 409, which cooperate respectively with peripheries of companion plate cams 410 and 411 secured on the shaft 332, which, it will be recalled, makes a clockwise revolution each machine operation and, in so doing, rocks the shaft 281 and arm 378 (Fig. 11) first counter-clockwise and back to normal position, according to the time given in space 3, Fig. 36.

Counter-clockwise movement of the shaft 281 and the arm 378 (Figs. 10, 11, 12, and 27) causes said arm 378, by means of the spring 379, to yieldingly urge the levers 375 and 383 counter-clockwise in unison therewith. If, during this counter-clockwise movement, the disks 386 and 387 are so positioned that there are no notches opposite the fingers of the feelers 384 and 385, counter-clockwise movement of said levers 375 and 383 will be obstructed and consequently the shaft 281 and the arm 378 will move independently thereof, flexing the spring 379, and in this case the statement slip ejecting mechanism will not function.

However, if the disks 386 and 387 are so positioned that there are notches in both disks opposite the adjacent fingers of the feelers 384 and 385 or a notch in the disk 386 opposite the left-hand finger on the feeler 384, the levers 375 and 383 will be free to move counter-clockwise in unison with the arm 378. Counter-clockwise movement of the lever 383 causes the surface 381 thereon, in cooperation with the stud in the pawl 338, to rock said pawl clockwise out of engagement with the shoulder 362 of the slide 279. This disengaging of the pawl 338 occurs at the time the booster slide 353 is in its extreme forward position, as shown in Figs. 21 and 35, and, as a result, the shoulder 362 is moved out of engagement with the end of the pawl 338, to ease the disengaging of this pawl.

Counter-clockwise movement of the arm 375 (Fig. 27) causes the stud 374, in cooperation with the camming surface 373, to rock the lever 348 clockwise, from the position shown in full lines in Fig. 27 to the position shown in dot-and-dash lines. Inasmuch as the slide 279 is in its forward position, the roller 346 on the pawl 344 is out of the path of the surface 347 on the lever 348, and consequently clockwise movement of said lever does not disengage said pawl 344 from the booster slide 353 (Fig. 35), and the stud 342 in the slide 279 (Fig. 10) prevents return of the slide 325. As a result, the slides 279, 325, and 353 return rearwardly in unison, until the roller 346 (Fig. 27) engages the surface 347 and rocks the pawl 344 out of engagement with the shoulder 352 on the booster slide 353. This disengages the slides 279 and 325 from the slide 353 and releases said slides to the action of the springs 322 and 331 (Fig. 16), which return said slides rearwardly, independently of the slide 353, until the roller 329 contacts the periphery of the cam 330, to terminate rearward movement of the slide 325. However, the slide 279, under influence of its spring 322, continues to travel rearwardly, causing the camming slot 277 therein, in cooperation with the roller 275, to rock the lever 273 counter-clockwise to disengage the roller 274 from the notch 276 in the rack 278 (Fig. 15), which rack, as previously explained, is controlled by the second transaction bank. This shifts the control of the statement slip feeding mechanism back to the slide 279, which carries the rack 268 rearwardly in unison therewith to the position shown in Fig. 15, to return the shaft 251, the stops 250, and the statement slip 243 to the position here shown.

During this returning of the statement slip 243, the guide 245, which is in the position shown in full lines in Fig. 16, guides the lower edge of the statement slip through the opening 261, and further, assisted by the guide 262, guides the lower edge of said statement slip between the ejecting rollers 263 and their associated pressure rollers 264. After this, the statement slip ejecting mechanism functions to invert said statement slip and deposit it face down in a receptacle at the front of the machine. After the slip ejecting mechanism functions, the guide 245 is restored clockwise to the position shown in dot-and-dash lines in Fig. 16 to open the throat of the machine for the insertion of another statement slip, said throat remaining open until the first operation of the machine in the preparation of another statement slip. The lever 383 (Fig. 10) retains the pawl 338 in disengaged position until after the shoulder 337 on the slide 279 has moved beyond the tooth of said pawl, which is obviously necessary so that said slide will return to home position, as shown in Fig. 13. Counter-clockwise movement of the lever 375 (Figs. 21 and 27) causes the lever 348 to disengage the pawl 344, irrespective of the position of the cam 350.

The slide 279 is moved to the position shown in Figs. 27 and 35 only in multiple-line operations, and when the Local service single line key 62 (Figs. 1 and 3) is depressed to print a single-line slip, said slide 279 is moved to the position shown in Figs. 20 and 23. In this case the control of the slip feeding mechanism is not shifted over to the second transaction bank, and consequently, when the lever 348 functions under influence of the feeler mechanism, the pawl 338 is rocked out of engagement with the shoulder 337 and the pawl 344 is retained out of the path of the shoulder 352, thus permitting the slide 279 to return to its extreme rearward or normal position to move the statement slip into engaging relationship with the ejecting rollers 263 and 264, so that said slip will be ejected after the "local service" item has been entered thereon. In this latter case, the cam 350 (Fig. 21) remains in the position here shown, to cause the lever 348 to retain the pawl 344 out of the path of the shoulder 352, prior to operation of the lever 375, to prevent the slide 279 from being moved to the position shown in Figs. 27 and 35 when it is desired to print on the first line of the statement slip. Therefore, when the Local service single line key 62 is used to print and eject a single-line bill, rocking of the plate 348 by the lever 375, as explained earlier herein, accomplishes no result, as said key positions the second transaction differential and the cam 350 as shown in Figs. 14, 17, and 21 to retain the pawl 344 out of the path of the shoulder 352.

*Mechanism for shifting the guide for the statement slips*

The mechanism for shifting the guide 245 from open throat position, as shown in Fig. 12, to closed throat position, as shown in Fig. 20, and back to open throat position, is shown in Fig. 37.

The shaft 251, which drives the feed rollers 247 for the statement slip, has pinned thereto a cam 420 for shifting the guide to closed throat position when the statement slip is fed to printing position by the first line control slide 279 alone or in combination with the rack 278. Coacting with the cam 420 is a roller 423 carried by a lever 421 pivotally supported on a printer side frame by the stud 422. A spring 424, connected to said lever 421, urges the roller 423 into engagement with the cam 420.

Also pivoted on the stud 422 is a second lever 426 having a stud 427 therein urged by a spring 425 into engagement with an extension 428 on the lever 421. A stud 430 in the upper end of the lever 426 engages the lower bifurcated end of a member 429 pinned to the shaft 253, to which shaft the guide 245 is fastened.

It is clear from the above arrangement that, when the shaft 251 is operated to feed the statement slip to the printing means in the first printing operation, the cam 420 will rotate in a clockwise direction and will rock the levers 421 and 426 in a clockwise direction and the member 429 and the shaft 253 in a counter-clockwise direction to move the guide 245 to closed throat position.

The yieldable connection between the levers 421 and 426 is provided to prevent any damage to the parts if an obstruction is between the guide 245 and the table 246 when the cam 420 operates the lever 421.

The roller 423 will remain in engagement with the high part of cam 420 as long as the slip is in any line space position; however, when the pawl 338 has been withdrawn from the first line control slide 279, as explained above, the slip is fed from printing position and the cam 420 is rotated counter-clockwise to the position shown in Fig. 37, and this brings the low portion of the cam opposite the roller 423.

To insure that the guide 245 will remain in closed throat position until near the end of an operation in which the slip is ejected, an additional control is provided to retain the guide in closed throat position even though the cam 420 has returned to its starting position. This control consists of an arm 431 pinned to the shaft 281, which shaft, as explained above, controls the time of operation of the feeler mechanism. The arm 431 coacts with a stud 432 carried by the lever 421, and, when the arm is rocked counter-clockwise with shaft 281, it will hold the guide in closed throat position, which position is maintained until near the end of a machine operation, as will be clear from space 3 in the timing chart in Fig. 36. When the arm 431 returns clockwise to its normal position near the end of the operation, the spring 424, acting on the lever 421, will move this lever and the lever 426 to move the guide 425 to open throat position.

*Five-line printing mechanism*

It will be recalled that, when it is desired to print a six-line slip, such as that shown in Figs. 31A and 31B, the lever 306 (Figs. 28 and 30) is positioned in its forward position, as shown in these figures, and when it is desired to print a five-line slip, such as that shown in Figs. 32A and 32B, the lever 306 is moved to its rearward position to cause all items except the first item, to be printed one line in advance so that there will be no empty space in the second line position, where the amount of the local messages is ordinarily printed.

As previously explained, shifting the lever 306 from its forward to its rearward position rotates the cam 301 approximately 180 degrees in a clockwise direction, causing said cam to move the shifting plate 295 from its upward position, as here shown, to its downward position. This downward movement of the plate 296 causes the studs 293 and 294, in cooperation with the camming slots 291 and 292, and guided by the slots 296 and 297 in the driving plate 298, to shift the segment 290 clockwise, in relation to said driving plate 298, the equivalent of one line space. This clockwise movement of the segment 290, through the gearing shown in Fig. 28, moves the shaft 284 clockwise, and said shaft, through the gearing shown in Figs. 18 and 22, moves the rack 278 rearwardly the equivalent of one line space, so that all the items entered on a five-line slip, with the exception of the first item, will be advanced one line space, to print the type of slip shown in Figs. 32A and 32B.

OPERATION

While it is believed that a clear understanding of the method of operating the machine embodying the instant invention will have been obtained from the preceding specification, nevertheless it is felt that a brief outline of operation, even though it involves a certain amount of repetition, will be helpful in recalling to mind the various features of the machine of this invention.

The chief difference between the six-line statement slip, shown in Figs. 31A and 31B, and the five-line statement slip, shown in Figs. 32A and 32B, is that the former is arranged for a system whereby the subscriber is charged a base rate for a certain number of calls each month and so much a call for all additional calls, and in the latter the subscriber pays a certain rental fee each month for the use of the telephone, thereby eliminating the additional messages charge. With the above exception, the two slips are exactly alike and are prepared in exactly the same manner; therefore the method of operation will be described chiefly in connection with the six line slip.

Describing the preparation of the six-line statement slip 243, shown in Figs. 31A and 31B, each subscriber has a ledger card with the local service rate thereon, which is the base rate for a maximum number of calls, and this same card likewise has thereon the "additional local messages" charge for all messages over the maximum number. Likewise each subscriber has a card with the toll service charge thereon, which includes long distance telephone calls, cables, telegrams, etc.; a card having thereon "other charges or credits," which include charges for the installation of additional equipment, or credits in connection with the removal of equipment previously installed; a card having thereon the monthly charge for directory advertising; and finally a card having thereon the balance due (debits or credits), which includes an amount owing on previously rendered bills or an amount due to the subscriber for the over-payment of such bills. The five different cards for each subscriber are, for example, segregated into five stacks corresponding to a certain group of subscribers for a certain exchange, and the stacks are then turned over to the billing department, where the data thereon is used in the preparation of the statement slips. Likewise the statement slips, bearing the names, addresses, and telephone numbers of the subscribers, are arranged in stacks corresponding to the various groups of subscribers, the cards and the slips for each group being stacked in proper sequence.

In preparing the statement slips for one group of subscribers, the operator arranges the five stacks of cards and the statement slips for this group within convenient reach. The operator then inserts the first statement slip in the machine, sets up the amount ($11,168.00), obtained from the local service card of the first subscriber, on the amount keys 52 (Fig. 1), and then depresses the local service multiple line key 63 to initiate operation of the machine and to select the first line for the printing of the amount of the first item thereon. During this operation, the amount ($11,168.00) is printed on the first line of the various portions of the statement slip and is simultaneously entered in the balance totalizer and in the corresponding individual totalizer on the #3 line.

In the next operation, the number of additional local messages (94,909) is ascertained from the same card as the local service data and is set up on the additional messages keys 53 (Fig. 1), and the charge for these additional calls ($189.90) is simultaneously set up on the amount keys 52. After this, the additional messages key 63 is depressed to initiate operation of the machine and select the second line of the statement slip for printing thereon, during which operation the number of the additional messages and the charge therefor are printed on the second line of the various portions of the statement slip.

Next, the toll service and telegraph charge, if any, is obtained from the card having that data thereon, and the amount thereof ($100.20) is set up on the amount keys 52 and the Toll key 63 is depressed to select the third line of the statement slip and to initiate operation of the machine. During this operation, the amount of the toll service and telegrams is printed on the third line of the various portions of the statement slip and is simultaneously entered in the balance totalizer and the individual totalizer corresponding to this particular item.

In the next operation, the amount of the "other charges or credits," if any, is obtained from the card bearing this data and the amount thereof ($32.67) is set up on the amount keys 52, and the Other charges key 63 or the Other credits key 62 is depressed to select the fourth line of the statement slip for printing thereon and to simultaneously initiate operation of the machine. During this operation, the amount of the charges or credits is printed on the fourth line of the various portions of the statement slip and said amount is simultaneously entered in the balance totalizer and in the individual totalizer corresponding to this item.

Next, the monthly charge for directory advertising, if any, is obtained from the card bearing this data, and the amount of said charge ($1.25) is set up on the amount keys 52 and the Direcory key 63 is depressed to select the fifth line of the statement slip and to simultaneously initiate operation of the machine. During this operation, the amount of the directory advertising charge is printed on the fifth line of the various portions of the statement slip and simultaneously entered in the balance totalizer and the individual group totalizer for this particular item.

Finally, the amount of the "balance due" debit or credit item is obtained from the card bearing this data and the amount thereof ($133.52) is set up on the amount keys 52 and the Balance due debit key 63 or the Balance due credit key 62, as the case may be, is depressed to select the sixth line of the statement slip and to simultaneously initiate operation of the machine. During this operation, the amount of the "balance due" debit or credit is printed on the sixth line of the various portions of the statement slip and is simultaneously entered in the balance totalizer and in the individual totalizer corresponding to this particular item. After all six of the items have been entered on the statement slip, the operator depresses the Total bill key 56 to initiate a balancing operation, during which the balance totalizer is cleared. The Total bill key likewise controls the second transaction differential to cause the total amount of the bill to be printed on the seventh line of the various portions of the statement slip 243 and to eject said slip. If the operator finds that the Total bill key 56 is locked against depression, this is an indication that the balance totalizer has been overdrawn and that there is a credit in favor of this particular subscriber, and, in order to clear and print this credit total, it is necessary to depress the Credit total key 62 and then the Total bill key 56.

If, during the printing of a particular statement slip, the operator discovers that the card containing the toll service and telegram charges has been placed in the wrong stack (for example, in the directory advertising card stack), this item may be entered in the totalizers of the machine and printed in the proper column of the statement slip by depressing the proper keys, regardless of the position of said statement slip when the mistake is discovered. In other words, the line selecting keys 62 and 63, with the exception of the Local service keys 62 and 63 (Fig. 1), as explained previously, will always cause a statement slip to be moved to the line corresponding to the depressed one of these keys, regardless of whether this movement requires forward or reverse feeding of said statement slip.

Even though it is likely that there will always be a local service charge for each subscriber, it is desired to point out that it is not necessary to depress the Local service multiple line key 63 first in the preparation of either six- or five-line bills, as any other of the keys 63 or the Other credits or balance due credit keys 62 may, if desired, be depressed in the first operation and the statement slip will be moved to the line corresponding to the depressed one of these keys in the first operation.

If for any reason it is desired to eject the statement slip before printing the total thereon, depression of the Eject key 62 will cause said statement slip to be immediately ejected, regardless of how many lines have been printed thereon.

If the operator notices that the only charge in connection with a particular customer's account is a local service charge, the amount of the local service charge is set up on the amount keys 52 (Fig. 1) and the Local service single line key 62 is then depressed to select the first line of the statement slip and to initiate operation of the machine. During this operation, the amount of the local service charge is printed on the first line of the statement slip and said statement slip is ejected immediately thereafter. The use of the Local service single line key is exactly the same in the preparation of six- or five-line statement slips.

As previously explained, the only difference between a five- and a six-line statement slip is that in the former there is a fixed monthly rental charge and no charge for "additional messages," and in this case it is desirable to omit the "additional messages" item without having a blank space appear between the first and third items. To accomplish this, moving the control lever 306 from the six-line position, as shown in Fig. 28, to the five-line position, indicated by the dot-and-dash line, moves the line selecting mechanism, controlled by the second transaction differential mechanism, one step forward to advance the feeding of the statement slip one line space, to eliminate the blank space between the first and the third lines of said slip.

As previously stated, there is an indicator wheel for each of the amount banks 52, an indicator wheel for the first and second transaction banks, and an indicator wheel for the keys in the total row, which visibly indicate the amount and type of operation being performed. As the statement slips for the various subscribers are printed and ejected, they are turned face down during the ejection thereof and deposited in this order in the receptacle provided therefor in the front of the machine, so that said statement slips will be in sequential order.

Preparing the remainder of the statement slips is but a repetition of the procedure outlined above.

After all of the statement slips for a particular group or for a particular period, whichever is desirable, have been prepared, a proof total printing operation is performed to prove the correctness of the account. This is accomplished by inserting a proof slip in the slip chute provided for this purpose and using the Clear debits key 60 (Fig. 1), in combination with the keys 63, to clear the individual totals for each of the items represented by these keys and to print said totals on the proof slip, and by using the Clear credits key 59, in combination with the Other credits key 62 and the Balance due credit key 62, to clear the totalizers for the items represented by these keys and to print said totals on the proof slip. As these various items are cleared from the totalizers of the machine, they are simultaneously entered in the previously cleared balance totalizer, all of the debit items being entered in the positive side of said totalizer and all of the credit items being entered in the negative side of said totalizer. Next, the Clear net key 58 is depressed to clear the balance totalizer and print the Net total on the proof slip. The various totals thus obtained are compared with the previously ascertained totals of the various items of a group of subscribers' accounts to prove the correctness of the statement slips prepared for this group of subscribers.

If at any time it is desired to read the balance totalizer, depressing the Sub-total key 57 causes the indicator wheels to be positioned in proportion to the amount standing on said balance totalizer, so that its condition may be ascertained. However, the Sub-total key 57 is a nonprinting key and therefore does not cause the sub-total to be recorded either upon the statement slip or upon the proof slip. If for any reason it is desired not to have any of the items represented by the keys 62 and 63 entered in their respective totalizers, depressing the Register non-add key 55, prior to the use of these keys, prevents the amounts of these items from being entered in their respective totalizers. As previously explained, the Register non-add key 55 is a stay-down key and may be released by depressing the release key 61.

While the form of mechanism herein shown and described is admirably adapted to fulfill the objects primarily stated, it is to be understood that it is not intended to confine the invention to the one form or embodiment herein disclosed, for it is susceptible of embodiment in various forms, all coming within the scope of the claims which follow:

What is claimed is:

1. In a machine of the class described, adapted to print records on the various lines of record material, the combination of means to feed the record material to various positions to receive records on the various lines thereof; means to drive the feeding means; means for operating the driving means to move the record material to a particular line; separate means for operating the driving means to move the record material selectively to any other of the various lines; and means for selectively coupling one or the other of the operating means to the driving means.

2. In a column-printing accounting machine adapted to print records on the various lines of record material, the combination of means to feed the record material to positions to receive records on the various lines thereof; means to actuate the feeding means; means to move the actuating means a certain degree to move the record material to a particular line; means to move the actuating means back and forth various degrees to move the record material to any other of the various lines; means to connect the actuating means to either of the two moving means, said means normally connecting said actuating means to the first moving means; and means effective when the actuating means is moved to other than the particular line to cause the connecting means to disconnect the actuating means from the first moving means and to connect said actuating means to the second moving means.

3. In a column-printing accounting machine, adapted to print records on the various lines of record material, the combination of means to move the record material to any of its various lines; means to actuate the moving means; line-selecting keys; means to operate the actuating means and move the record material to a particular line position; means to operate the actuating means and move the record material selectively to any other of its line positions according to which of the line-selecting keys is operated; and means controlled by said line-selecting keys for controlling selectively the operation of the moving means by the operating means.

4. In a column-printing accounting machine, adapted to print records on a plurality of lines of record material, the combination of means to feed the record material; means to actuate the feeding means to move the record material to a certain line; means to actuate the feeding means to move the record material to any of the other lines; means to connect one or the other of the two actuating means to the feeding means, said connecting means normally connecting the first actuating means to said feeding means; means to impart a certain degree of movement to the first actuating means to cause the feeding means to move the record material to a particular line; and means to impart another degree of movement to the first actuating means to cause the connecting means to function to disconnect the first actuating means from the feeding means and to connect the second actuating means to said feeding means so that the record material may be moved to the other lines.

5. In a column-printing accounting machine, having means to print records on the various lines of record material during a series of machine operations, the combination of feeding means to present the record material to the printing means; operating means effective in the first operation of the machine to move the feeding means to present a particular line of the record material to the printing means; additional operating means effective in the first or subsequent operations of the machine to move the feeding means to move the record material past said particular line to present any other line of the record material to the printing means; and coupling means normally connecting the first-mentioned operating means to the feeding means to cause the feeding means to move the record material to present the particular line on the record material to the printing means and shiftable to disconnect said first-mentioned operating means from the feeding means and to connect the additional operating means to the feeding means to enable the feeding means to move the record material to present any other line thereon to the printing means.

6. In a column-printing accounting machine, having means to print records on the various lines of record material in a series of operations, the combination of feeding means to present the record material to the printing means; a plurality of depressible line-selecting keys; means controlled by depression of certain of the line-selecting keys and effective in the first operation to operate the feeding means to present the first line of the record material to the printing means; and means controlled by depression of other of the line-selecting keys and effective in the first or subsequent operations to operate the feeding means to present to the printing means the line corresponding to the depressed key.

7. In a column-printing accounting machine, having means to print records on the various lines of record material, the combination of means to feed the record material to bring the various lines thereof into printing position; a first means to control the feeding means to bring a particular line of the record material into printing position; a second means to control the feeding means to move the record material to any other line; means on the feeding means to connect the first or second controlling means thereto, said connecting means normally connecting the first controlling means to said feeding means; means to move the first controlling means from normal position to a certain position to cause the feeding means to feed the record material to the particular line; means to move the first controlling means to another position to cause the connecting means to function to disconnect the feeding means from said first controlling means and to connect said feeding means to the second controlling means, to cause the record material to be moved to any other line; means to retain the first controlling means in either of its moved positions; and means to render the retaining means and the second moving means ineffective to cause the first controlling means to return to normal position to cause the connecting means to function to disconnect the feeding means from the second controlling means and to connect said feeding means to said first controlling means.

8. In a column-printing accounting machine, having means to print records on the various lines of record material, the combination of means to feed the record material to bring its various lines into printing position; means to operate the feeding means to move a particular line of the record material to printing position; means to operate the feeding means to move the other lines of the record material to printing position; means to connect either of the operating means to the feeding means, said means normally connecting the first operating means to said feeding means; means to impart a certain degree of movement to the first operating means to move the particular line of the record material to printing position; means to impart another degree of movement to said first operating means to cause the connecting means to function to disconnect the feeding means therefrom and to connect said feeding means to the second operating means; and means to control the operation of the second operating means to determine which of the other lines and in what order they will be moved to printing position.

9. In a column-printing accounting machine, having means to print records on the various lines of record material, the combination of means to feed the record material to bring its various lines into printing position; means to operate the feeding means to move a particular line of the record material to printing position; means to operate the feeding means to move the other lines of the record material to printing position; means to connect the feeding means to either of the operating means, said means normally connecting the first operating means to said feeding means; means to impart a certain degree of movement to the first operating means to move said particular line of the record material to printing position; means to impart another degree of movement to the first operating means to operate the connecting means to disconnect the feeding means from said first operating means and to connect said feeding means to the second operating means, said second imparting means normally disconnected from said first operating means; means controlled by the second operating means to connect the second imparting means to the first operating means; and selective means cooperating with the second operating means to determine which of the other lines and in what order they will be presented to the printing means.

10. In a column-printing accounting machine, having means to print various items in their respective linear positions on record material and means to eject said record material after printing is completed, the combination of means to feed the record material to the printing means and the ejecting means; means to operate the feeding means to cause a particular line of the record material to be moved to printing position; means to operate the feeding means to cause the other lines of the record material to be moved to printing position; means to connect the feeding means selectively to either of the two operating means, said means normally connecting the feeding means to the first operating means; means to impart a certain degree of movement to the first operating means to cause the feeding means to move said particular line to printing position; means to impart another degree of movement to the first operating means to cause the connecting means to function to disconnect said first operating means from the feeding means and to simultaneously connect the second operating means thereto; means to selectively control the second operating means to determine the order in which the other lines will be presented to the printing means; normally effective means to retain the first operating means in either of its moved positions; and selectively controlled means to render the retaining means and the second imparting means ineffective, to cause the first operating means to return to normal position which in turn causes the connecting means to function to disconnect the feeding means from the second operating means and to simultaneously connect said feeding means to the first operating means, whereupon said first operating means, during the remainder of its return movement, causes the feeding means to move the record material into cooperative relationship with the ejecting means.

11. In a machine of the class described, having means to print on the various lines of record material, the combination of means to feed the record material to the printing means; a first means to operate the feeding means to cause the first line of the record material to be fed to printing position; a second means to operate the feeding means to cause the other lines of the record material to be fed selectively to printing position; a plurality of depressible line-selecting keys; and means including a member selectively controlled by depression of certain of the keys to render the first operating means operative to drive said feeding means, said member also selectively controlled by depression of the other keys to effectuate the second controlling means, to determine whether the record material will be fed to first-line printing position or to one of the other printing positions.

12. In a column-printing accounting machine, having means to print records on a plurality of lines of record material, the combination of means to feed the record material to the printing means; means to actuate the feeding means; means to operate the actuating means to cause the feeding means to move the record material to a particular line; means to operate the actuating means to cause the feeding means to move the record material to any other line; a plurality of line-selecting keys; and means, including a member selectively positioned under control of the keys, and an element operated by the member according to the position thereof, to control the effectiveness of the two operating means to determine whether the particular line or one of the other lines will be fed to printing position.

13. In a column-printing accounting machine, having means to print records on a plurality of lines of record material, the combination of means to feed the record material to the printing means; means to actuate the feeding means; means to operate the actuating means to cause the feeding means to move the record material to a particular line; means to operate the actuating means to cause the feeding means to move the record material to any other line; a plurality of line-selecting keys; means to connect either of the operating means to the actuating means, said means normally connecting the first operating means to said actuating means; and means, including a member selectively controlled by the keys, to determine whether the actuating means will remain connected to the first operating means or will be connected to the second operating means.

14. In a column-printing accounting machine, having means to print records on a plurality of lines of record material, the combination of means to feed the record material to the printing means; means to actuate the feeding means; means to operate the actuating means to cause the feeding means to move the record material to a particular line; means to operate the actuating means to cause the feeding means to move the record material to any other line; a plurality of line-selecting keys; means to connect either of the operating means to the actuating means, said means normally connecting the first operating means to said actuating means; means to impart a certain movement to the first operating means to move the particular line of the record material to printing position; means to impart another movement to the first operating means to disconnect said operating means from the actuating means and to connect the second operating means to said actuating means; means to connect the second imparting means to the first operating means; and means selectively controlled by the keys to control the operation of the second connecting means to determine which of the operating means will be effective.

15. In a column-printing accounting machine, having means to print on a plurality of lines of record material, the combination of means to feed the record material to the printing means; means to actuate the feeding means; means to operate the actuating means to feed the record material to a particular line; means to operate the feeding means to feed the record material to any of the other lines; means to connect the actuating means to either of the operating means; means to move the first operating means a certain extent to move the record material to said particular line; means to move the first operating means another extent to cause the connecting means to function to disconnect the actuating means from said first operating means and to connect said actuating means to the second operating means; means to connect the second moving means to the first operating means; a plurality of line-selecting keys; a member adapted to be selectively positioned by the keys; and an element to transmit the positioning of the member to the second connecting means to control the effectiveness of said connecting means to determine which of the operating means will be effective.

16. In a machine of the class described, having means to print records on the various lines of record material and means to eject the record material when printing is completed, the combination of means to feed the record material to the printing means; means to actuate the feeding means; means to operate the actuating means to feed a particular line of the record material to printing position and to feed said record material to the ejecting means; means to operate the actuating means to feed any of the other lines of the record material to printing position; means to connect the actuating means to either of the operating means, said connecting means normally connecting the first operating means to said actuating means; a plurality of line-selecting keys; means controlled by certain of the line-selecting keys to impart one movement to the first operating means to move the record material to the particular line; means controlled by the other line-selecting keys to impart another movement to the first operating means to cause the connecting means to function to disconnect the actuating means from the first operating means and to connect said actuating means to the second operating means; means to retain the first operating means in either of its moved positions; and selectively controlled means to render the retaining means ineffective to cause the first operating means to feed the record material to the ejecting means and to cause the connecting means to disconnect the actuating means from the second operating means and to connect said actuating means to the first operating means.

17. In a column-printing accounting machine, having means to print on a plurality of lines of record material and means to eject the record material when printing is completed, the combination of means to feed the record material to the printing means; means to actuate the feeding means; means effective when moved in one direction to operate the actuating means to feed a particular line of the record material to printing position, and effective when moved in another direction to feed the record material to the ejecting means; yieldable means to move said first operating means in said other direction; means to operate the actuating means to feed any other line of the record material to printing position; line-selecting keys to control the two operating means; means to connect the actuating means to either of the operating means, said connecting means normally connecting the first operating means to said actuating means; means controlled by certain of the line-selecting keys to impart a certain degree of movement to the first operating means in the one direction to move the particular line of the record material to printing position; means controlled by the other line-selecting keys to impart another degree of movement to the first operating means in said one direction to cause the connecting means to disconnect the first operating means from the actuating means and to connect the second operating means thereto; means to retain the first operating means in either of its moved positions; control keys; and means selectively positioned by the control keys to render the retaining means ineffective to cause the yieldable means to move the first operating means in said other direction to cause the connecting means to disconnect the second operating means from the actuating means and to connect said actuating means to the first operating means to feed the record material to the ejecting means.

18. In a machine of the class described, having means to print records on the various lines of record material, the combination of means to feed the record material to the printing means; means to actuate the feeding means; means to operate the actuating means to move the first line of the record material to printing position; means to operate the actuating means to move the other lines of the record material to printing position; means to connect either of the operating means to the actuating means, said means normally connecting the first operating means to said actuating means; a plurality of depressible line-selecting keys; means effective when certain of the keys are depressed to impart a certain degree of movement to the first operating means to move the first line of the record material to printing position; means effective when certain other of the keys are depressed to impart another degree of movement to the first operating means to cause the connecting means to disconnect the actuating means from said first operating means and to connect said actuating means to the second operating means; and a differentially positionable device connected to the second operating means and controlled by said certain other keys to move the record material to the line corresponding to said certain other keys.

19. In a machine of the class described, having means to print records on the various lines of record material, the combination of means to feed the record material to the printing means; means to actuate the feeding means; means to operate the actuating means to move the first line of the record material to printing position; means to operate the actuating means to move the other lines of the record material to printing position; means to connect either of the operating means to the actuating means, said means normally connecting the first operating means to said actuating means; a plurality of depressible line-selecting keys; means effective when any one of certain of the line-selecting keys is depressed to impart a certain degree of movement to the first operating means to move the first line of the record material to printing position; means effective when any one of certain other of the keys is depressed to impart another degree of movement to the first operating means to cause the connecting means to disconnect the actuating means from said first operating means and to connect said actuating means to the second operating means; a differentially positioned device for connecting the line-selecting keys to the second operating means, so that said certain other keys will move the record material to the line corresponding thereto; means to connect the second imparting means to the first operating means; and means selectively positioned by the differential device to render the last-named connecting means ineffective when any one of said certain of the line-selecting keys is depressed and to render said connecting means effective when any one of said certain other of the line-selecting keys is depressed to determine which of the operating means is connected to the actuating means.

20. In a column-printing accounting machine, having means to print on the various lines of record material and means to eject the record material after printing is completed, the combination of means to feed the record material to the printing means and the ejecting means; means to actuate the feeding means; a plurality of depressible line-selecting keys; means controlled by depression of certain of the line-selecting keys to operate the actuating means to move the first line of the record material to printing position; means controlled by depression of the other line-selecting keys to operate the actuating means to move the other lines of the record material to printing position; means, effective when the first operating means is moved in one direction to connect the second operating means to the actuating means and effective when said first operating means is moved in another direction to connect said first operating means to the actuating means; yieldable means to move the first operating means in said other direction; means to move the first operating means a certain distance in said one direction to move the first line of the record material to printing position; means to move the first operating means an additional distance in said one direction to cause the connecting means to function to disconnect the actuating means from said first operating means to connect the second operating means to said actuating means; means, controlled by said other line-selecting keys, to connect the second moving means to the first operating means; means to arrest the first operating means in either of its moved positions in said one direction; control keys; and means, comprising selecting disks, positioned by the control keys, and feelers cooperating therewith, to disengage the second connecting means and the arresting means to cause the yieldable means to move the first operating means in said other direction to cause the first connecting means to function to reconnect the said first operating means to the actuating means, to cause the feeding means to move the record material to the ejecting means.

21. In a column-printing accounting machine, having means to print records on the various lines of record material and means to eject the record material when printing is completed, the combination of means to feed the record material to the printing means and the ejecting means; means to actuate the feeding means; a plurality of depressible line-selecting keys; means to operate the actuating means to cause the feeding means to feed the record material to the ejecting means; a differential device adapted to be positioned by the line-selecting keys; means controlled by the differential device to operate the actuating means in proportion to the depressed line-selecting keys to select the lines on the record material corresponding to said keys, without regard to the order in which said lines are selected; a coupling device on the actuating means adapted to alternatively couple either of the operating means to said actuating means, said means normally coupling the first operating means to said actuating means; yieldable means to move the first operating means in one direction; means to move the first operating means in another direction to cause the coupling means to couple the second operating means to the actuating means; means, effective when any one of the line-selecting keys is depressed, to connect the second moving means to the first operating means; means to retain the first operating means in moved position; control keys; and means, including disks positioned by the control keys and feelers cooperating therewith, to disengage the connecting means and the retaining means to cause the yieldable means to return the first operating means in said one direction to cause the coupling means to couple the actuating means to said first operating means, whereupon continued movement of said first operating means in said one direction causes the feeding means to feed the record material to the ejecting means.

22. In a machine of the class described having means to print on various lines of record material, the combination of a plurality of line selecting keys; differential mechanism controlled by said keys; means to feed the record material to bring different lines to printing position; actuating means for said feeding means; means to drive said actuating means to operate the feeding means to move the record material to first line position; means differentially operable by said differential mechanism to drive the actuating means to operate the feeding means to move the record material to the other line positions in any order as determined by the differential operation of the differential mechanism; means selectively operable to connect either driving means to the actuating means; and means controlled by the differential mechanism to control the selective operation of the connecting means to connect one or the other of the driving means to the actuating means.

23. In an accounting machine having means to print on various lines of record material, the combination of a plurality of line selecting keys; differential mechanism controlled by said keys; means to feed the record material to various positions relative to said printing means; actuating means for said feeding means; means to drive said actuating means and therethrough the feeding means to move the record material to a predetermined position relative to said printing means; means connected to said differential mechanism and differentially settable thereby to drive the actuating means and therethrough the feeding means to move the record material from said predetermined position selectively to other positions relative to said printing mechanism; means to couple the actuating means selectively to either of said driving means; and means controlled by said differential mechanism to control the selective coupling of said one or the other driving means to said actuating means; said differential mechanism, when positioned under control of certain of said keys, controlling the coupling means to allow the first driving means to be effective and, when positioned under control of other of said keys, controlling the coupling means to render the second driving means effective to operate said actuating means and also to control the extent of operation of the second driving means.

24. In an accounting machine having means to print on various lines of record material, the combination of a plurality of line selecting keys; a differential mechanism controlled by said keys; means to feed the record material to bring different lines into printing position; actuating means for said feeding means; a cam shaft; a cam on said shaft; driving means operated by said cam to operate the actuating means a predetermined extent and therethrough the feeding means to feed the record material to first line position; driving means connected to said differential mechanism and variably shifted thereby to operate the actuating means and therethrough the feeding means to position the record material to any other line position according to the setting of the differential mechanism; means to selectively couple the actuating means to either driving means; and means controlled by the differential mechanism to control the selective operation of the coupling means to couple one or the other of said driving means to the actuating means.

MAYO A. GOODBAR.

CERTIFICATE OF CORRECTION.

Patent No. 2,305,000. December 15, 1942.

MAYO A. GOODBAR.

It is hereby certified that error appears in the printed specification of the above numbered patent requiring correction as follows: Page 5, first column, line 13, for "in" read --to--; page 16, first column, line 15, for "plate 296" read --plate 295--; and second column, line 32, after "53" insert --and 54--; page 19, second column, line 46, claim 11, for "operative" read --operable--; line 49, same claim, for "effectuate the second controlling means," read --render the second controlling means operative to drive said feeding means,--; and that the said Letters Patent should be read with this correction therein that the same may conform to the record of the case in the Patent Office.

Signed and sealed this 23rd day of February, A. D. 1943.

Henry Van Arsdale,
(Seal) Acting Commissioner of Patents.